United States Patent [19]

Nagao et al.

[11] Patent Number: 5,552,845
[45] Date of Patent: Sep. 3, 1996

[54] CAMERA

[75] Inventors: Masaki Nagao, Tokyo; Shinya Takahashi, Kodaira; Tamotsu Koiwai, Akikawa; Yoshito Kobayashi, Hachioji, all of Japan

[73] Assignee: Olympus Optical Co., Ltd., Tokyo, Japan

[21] Appl. No.: 104,456

[22] Filed: Aug. 10, 1993

[30] Foreign Application Priority Data

| Aug. 10, 1992 | [JP] | Japan | 4-212969 |
| Aug. 26, 1992 | [JP] | Japan | 4-227555 |
| Oct. 5, 1992 | [JP] | Japan | 4-266170 |
| Oct. 20, 1992 | [JP] | Japan | 4-281804 |
| Oct. 28, 1992 | [JP] | Japan | 4-290520 |
| Oct. 28, 1992 | [JP] | Japan | 4-290522 |
| Feb. 9, 1993 | [JP] | Japan | 5-21511 |

[51] Int. Cl.$^6$ .............................. G03B 17/02; G03B 13/10
[52] U.S. Cl. .............................. 354/159; 354/222
[58] Field of Search .............................. 354/159, 94, 481, 354/105, 106, 219, 222

[56] References Cited

U.S. PATENT DOCUMENTS

| Re. 32,797 | 7/1988 | Harvey | 354/481 |
| 4,529,283 | 7/1985 | Oshwa et al. | 354/272 |
| 4,639,111 | 9/1987 | Harvey | 354/481 |
| 4,652,104 | 10/1987 | Harvey | 354/106 |
| 4,697,901 | 10/1987 | Wakabayashi et al. | 354/221 |
| 4,774,536 | 6/1988 | Inoue et al. | 354/106 |
| 4,943,825 | 8/1990 | Taniguchi et al. | 354/481 |
| 5,051,770 | 9/1991 | Cornuejols | 354/432 |
| 5,066,971 | 11/1991 | Kodaira | 354/465 |
| 5,111,228 | 5/1992 | Hansen | 354/222 |
| 5,255,030 | 10/1993 | Mukai et al. | 354/94 |
| 5,298,929 | 3/1994 | Tsuhefuji et al. | 354/159 |
| 5,327,183 | 7/1994 | Kurei | 354/129 |
| 5,345,285 | 9/1994 | Hasushita et al. | 354/159 |

FOREIGN PATENT DOCUMENTS

| 295534 | 12/1986 | Japan . |
| 285432 | 12/1986 | Japan . |
| 62-50741 | 3/1987 | Japan . |

Primary Examiner—Michael L. Gellner
Assistant Examiner—Nicholas J. Tuccillo
Attorney, Agent, or Firm—Louis Weinstein

[57] ABSTRACT

The present invention provides a camera enabling selection of a normal photography mode in which an object image formed by a lens array is printed as it is or in a proportional size, or a trimming photography mode in which part of the image alone is enlarged and printed.

The camera includes masks formed with translucent members and used to confirm the object range for the trimming photography mode in the view finder, and a device for positioning the masks in the view finder for trimming photography.

12 Claims, 22 Drawing Sheets

AREA OF A FIELD OF VIEW
IN A VIEWFINDER (28-28 CROSS SECTION)

(RRIOR ART)

CAMERA

BACKGROUND OF THE INVENTION

1. Field of the Invention

The present invention relates to a picture size selective camera, and more particularly, a picture size selective camera permitting photography in a photography mode of a normal size and a photography mode of a picture size different from the normal size.

2. Description of the Related Art

In recent years, numerous proposals have been made for a camera permitting photography of a normal size as well as photography of a trimming size such as a pseudo-panorama size (for example, a picture size of 13 mm by 36 mm, hereinafter, a panorama size). Such cameras have already been put on the market. As for the camera permitting panoramic photography, a proposal has been made for a camera in which a picture range of a panorama size can be identified In the field of view of the viewfinder. For example, Japanese Patent Laid-open No. 61-285432 has disclosed a technological means that, when panorama photography is designated, as shown in FIG. 9, shields the upper and lower parts of the field of view in a viewfinder with opaque masks and thus enables identification of a picture range of a panorama size. Japanese Patent Laid-open 62-50741 has introduced an example in which various field frames that indicate picture ranges for photography of a trimming size are installed in a viewfinder.

Using the technological means proposed in the Japanese Patent Laid-open No. 61-285432, the entire field of view except a picture range of a panorama size is masked as shown in FIG. 9. In a panoramic photography mode of a panorama size in which a narrow range alone especially looks small, or in a pseudo-telephotography mode of a pseudo-telephotographic size, a photographer has difficulties in achieving framing appropriately while looking around.

The technological means proposed in the Japanese Patent Laid-open No. 62-50741 facilitates misidentification of a photography mode because of the existence of various kinds of frames.

According to the technological means proposed in Japanese Patent Laid-open No. 61-295534, a ray control unit is installed in an exposure control unit for a photographic camera permitting pseudo-telephotography. The ray control unit includes a viewfinder and selects a field of view for pseudo-telephotography so that a quantity of light reaching a sensitized element will be controlled in proportion to a quantity of light supplied to the pseudo-telephotographic field of view. The beam control unit shields a focusing screen with opaque (dark) masks without changing the angle of light reception of a photometric element (sensitized element), and thus indicates a picture range that is narrower than a normal size. Photometry is then carried out.

The Japanese Patent Laid-open No. 61-295534 has further disclosed a technological means that uses an LCD to display a field frame for defining a trimming picture range.

U.S. Pat. No. 4,943,825 has proposed a technological means wherein, whichever photography mode is selected, photomerry involves a certain range alone that substantially corresponds to the picture range for a photography mode of a pseudo-telephotographic size, so that an exposure value can be calculated correctly.

U.S. Pat. No. 4,774,536 has proposed a technological means that includes a first photomerry means and a second photomerry means, and selects either of these two photomerry means depending on a photography mode.

However, the ray control unit disclosed in the Japanese Patent Laid-open No. 61-295534 indicates a picture range, which is narrower than the normal picture range, by shielding the focusing screen with opaque (dark) masks without modifying the angle of light reception of a photometric element (sensitized element), and then performs photomerry. Photomerry concludes that the areas of the opaque (dark) masks are dark. As a whole, the focusing screen is likely to be recognized as darker than it actually is.

In the Japanese Patent Laid-open No. 61-295534, the field frame representing the trimming picture range is displayed on an LCD. The incorporation of the LCD results in a cost increase. Since the LCD is always conducting during the display of a field frame, a large amount of power is required. If the surroundings are dark, it is hard to look at the LCD. Since the LCD intercepts light, the viewfinder becomes dark.

In the photometric means in the U.S. Pat. No. 4,943,825, photomerry is oriented to the picture range of a pseudo-telephotographic size; that is, a considerably narrow picture size for, for example, panoramic photography (the long side of film has a normal dimension but the short side thereof is a half of a normal dimension). For photography of a normal picture size, there is a problem that photomerry is oriented to the center of the picture range but not performed uniformly over the picture range.

The photomerry means in the U.S. Pat. No. 4,774,536 consists of two photomerry means, which results in a complex photomerry unit.

U.S. Pat. Re. No. 32,797 has proposed a technological means in which a photomerry means performs photomerry on a trimming picture range for trimming photography, and then an exposure control means performs parameter compensation on the metered value to calculate a correct exposure value.

The technological means in the U.S. Pat. Re. No. 32,797 has a drawback that the luminance limit for photomerry of low luminance decreases because of the narrow photometric range for trimming photography.

The U.S. Pat. No. 4,774,536 has proposed a technological means that comprises photomerry means for performing photomerry on wide and narrow ranges respectively and that forcibly activates the means for performing photomerry on a narrow range in the photography mode of a pseudo-telephotographic size (mode in which only a narrow picture range is printed and enlarged). The U.S. Pat. No. 4,943,825 has disclosed a technological means that includes a means for performing photomerry on a predetermined range regardless of a photography mode. The photometric range is substantially equal to or narrower than a picture range In the photography mode of a pseudo-telephotographic size.

Problems concerning the related arts disclosed in the U.S. Pat. Nos. 4,774,536 and 4,943,825 will be discussed below.

FIG. 42 is an explanatory diagram showing the distribution of sensitivity of a photomerry unit with respect to incident rays entering through a focusing screen in a conventional picture size selective camera. In FIG. 42, each contour line indicated with reference numeral 201 links points of the same sensitivity. A contour line indicates a sensitivity that is twice or half the sensitivity of an adjoining line.

When the generally-employed photometric sensitivity distribution as that shown in FIG. 42 is employed for a picture size selective camera, a metered value has an error. The underlying reason will be described below.

FIG. 43 is an explanatory diagram showing the distribution of sensitivity of a photomerry unit in a conventional picture size selective camera occurring when masks are applied to the field of view in the viewfinder to restrict the focusing screen to a panorama size.

In general, a photomerry unit is controlled so that it will provide a normal value when viewfinder field masks 202 are not present. In this example, when the viewfinder field masks 202 are inserted to provide a selected panorama size, rays originating from the hatched areas in the right of FIG. 43 are suppressed and are not sensed at all. Photomerry therefore concludes that the areas are dark. In other words, the areas are recognized as darker than they actually are. In an automatic exposure mode, a larger exposure value is therefore specified. Overexposure ensues.

FIG. 44 is an explanatory diagram showing the photometric sensitivity distribution of the technological means proposed in the U.S. Pat. No. 4,943,825. In this example, photomerry is confined to a minimum selective picture range.

According to the above method, a photometric error does not occur in the photography mode of a trimming size. However, as shown in FIG. 44, since photomerry is concentrated on the center area alone, a photograph with a well-balanced quantity of light is unavailable in the normal photography mode because quantities of light in the surrounding areas are not taken into account. As shown in FIG. 44, assuming that the light of a room lamp or the like is seen present in the upper part of a film screen, the light is ignored completely. When the whole film screen is used for printing, an area surrounding the room lamp results in marked overexposure. Although the center of the film screen is properly exposed, the film screen results in an unnatural photograph as a whole.

OBJECTS AND SUMMARY OF THE INVENTION

A first object of the present invention is to resolve the aforesaid drawbacks in a camera permitting trimming photography in which part of a film screen alone is enlarged and printed.

A second object of the present invention is to optimize the mode select display in a camera permitting trimming photography in which part of a film screen alone is enlarged and printed.

A third object of the present invention is to enable correct recognition of a picture range or composition in a camera permitting trimming photography in which part of a film screen alone is enlarged and printed.

A fourth object of the present invention is to enable correct photomerry in a camera permitting trimming photography in which part of a film screen alone is enlarged and printed.

Briefly, the present invention provides a camera enabling selection of either a normal photography mode in which an object image formed by a lens array is printed as it is or in a proportional size, or a trimming photography mode in which part of the image alone is enlarged and printed. The camera includes:

mask means that are formed with translucent members and used to identify an object range in a viewfinder in the trimming photography mode; and a means for positioning the mask means in the viewfinder during trimming photography.

The aforesaid objects and advantages of the present invention will be further apparent from the detailed description below.

DETAILED DESCRIPTION OF THE PREFERRED EMBODIMENTS

Embodiments of the present invention will be described below with reference to the drawings.

Figure 48A:
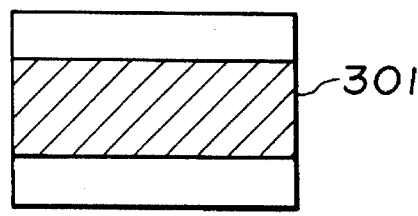
FIGS. 48A and 48B show trimming picture ranges according to the present invention.
Figure 48B:
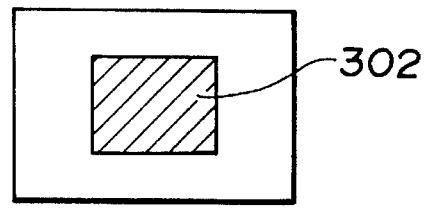

In the present invention, a trimming picture range refers to a range indicated with reference numeral 301 in FIG. 48A or a range indicated with reference numeral 302 in FIG. 48B.

Figure 1:
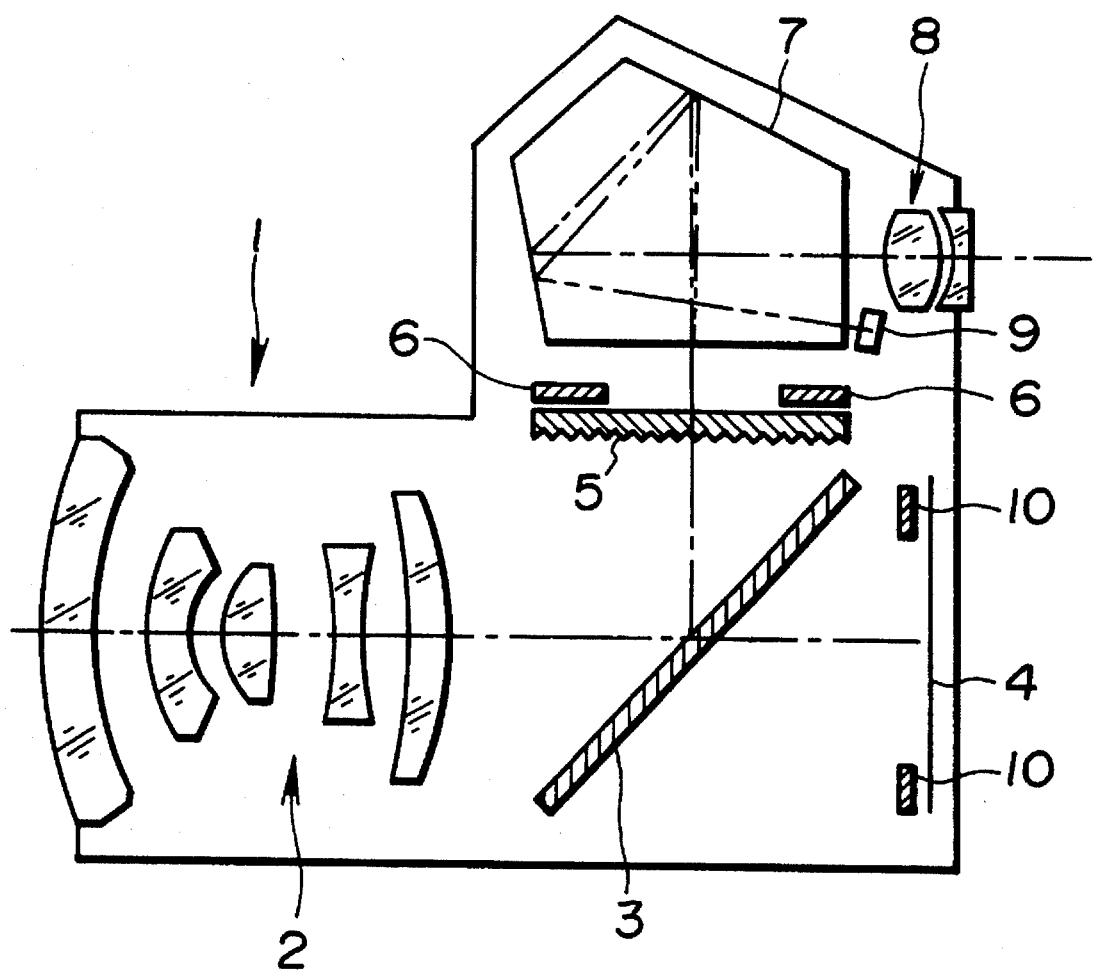
FIG. 1 shows a center longitudinal section of a picture size selective camera representing a first embodiment of the present invention.

FIG. 1 shows a center longitudinal section of a picture size selective camera representing the first embodiment of the present invention.

The picture size selective camera of the first embodiment is a camera having normal photographic functions and comprising a normal lens array 2 arranged in, the front part of a camera body 1, a reflecting mirror 3 for reflecting the object light emerging from the lens array 2 upward, a focusing screen 5 on which an object image is formed when the camera is in focus, field masks 6 arranged rearward and forward locations immediately above the focusing screen 5, and a prism having a roof on which an image formed on the focusing screen 5 is observed as a correct image through a magnifier 8.

Film 4 resides at a position equivalent to an image formation surface on the focusing screen 5. During exposure, the reflecting mirror 3 ascends, and a shutter which is not shown opens to expose the film 4 to light.

A photomerry member 9 is interposed between the focusing screen 5 and magnifier 8 so that the film 4 will be exposed by a proper exposure value. Rays emitted by the formed object image are metered by photomerry.

When a picture size of a trimming picture range which is different from a normal picture size; such as, a pseudo-panorama size (size shown in FIG. 48A, for example, 13 mm by 36 mm) or a pseudo-telephotography size (size shown in FIG. 48B, for example, 12 mm×18 mm) is selected, film screen masks 10 for defining a selected picture size are used to define a picture size for a film screen. It is, thus, specified which area of the full-size film screen will be used for printing.

Separately, the field of view in a viewfinder corresponding to an area of a film screen used for printing is distinguished in the viewfinder, thus informing a photographer of which area of the film screen is to be used for printing. In the first embodiment, the field masks 6 are placed between the focusing screen 5 and magnifier 8 in order to restrict the field of view in the viewfinder. On behalf of the field masks 6, a liquid crystal display may be employed to display the field of view in a viewfinder.

Rays passing through the lens array 2 are angled by the reflecting mirror 3. When the camera is in focus, the rays form an image on the focusing screen 5. The film 4 is located at a position equivalent to the image formation surface on the focusing screen 5. During exposure, the reflecting mirror 3 ascends, and the shutter, which is not shown, opens to expose the film to light.

Figure 2:
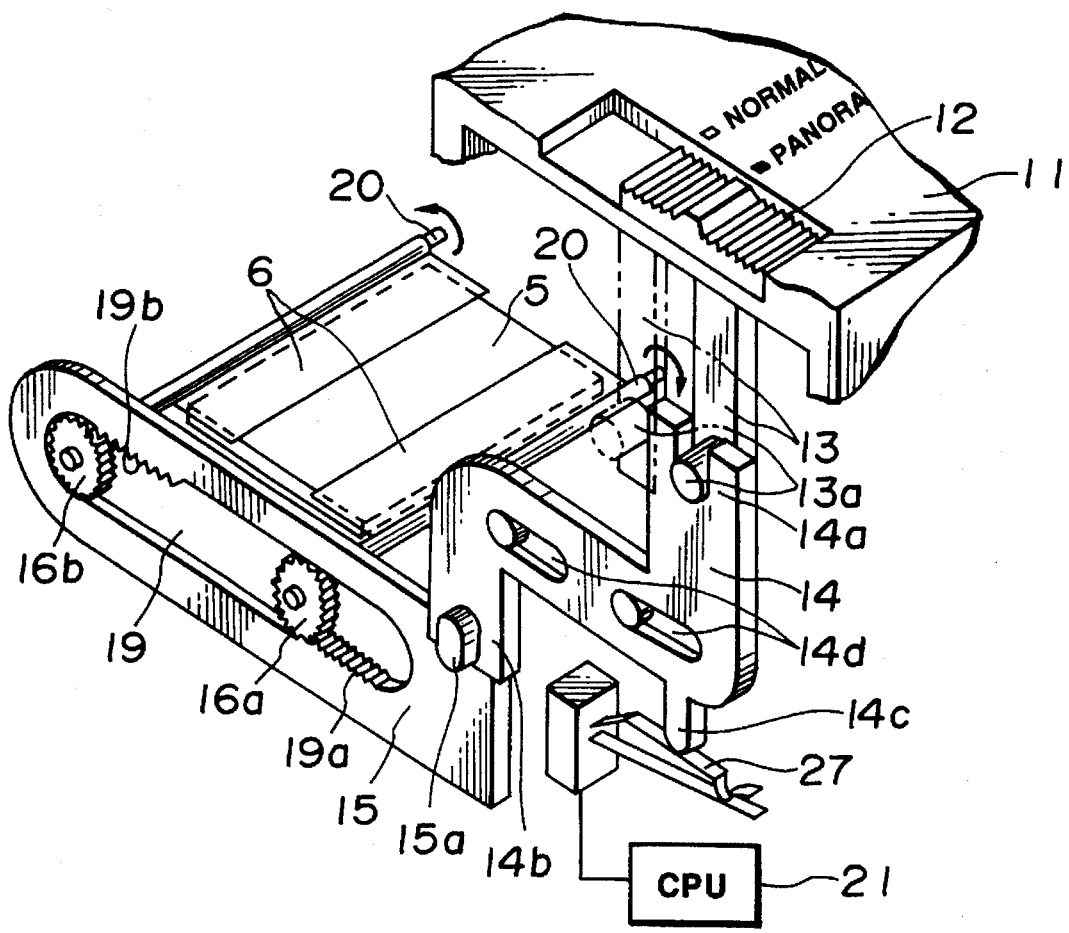
FIG. 2 is an enlarged oblique view of a major portion including field masks and their peripheral components in the first embodiment.

FIG. 2 is an enlarged oblique view showing a major portion including the field masks 6 and peripheral components in the first embodiment. In an example in FIG. 2, it is enabled to identify a picture range used for printing in a viewfinder, which is interlocked with the selection of a photography mode.

A picture size select switch 12 is formed at a specified position on the top of a casing member 11 of a camera body. By manipulating the picture size select switch 12 externally, either a normal photography mode or a trimming photography mode (in FIG. 2, a panoramic photography mode is adopted as the trimming photography mode) can be selected. A coupling arm 13 is united with and descending from the picture size select switch 12. Interlocked with the sliding of the picture size select switch 12, the coupling arm 13 moves in the same direction as the sliding direction.

A crank-like link 14 having forks 14a and 14b at both ends is located under the coupling arm 13. The fork 14a formed at the upper end of the link 14 engages with a coupling pin 13a fixed to the lower end of the coupling arm 13. Two guide holes 14d are bored in the middle of the link 14. Fitting pins fixed to a camera body, which is not shown, are fitted into the guide holes 14d. Thus, the link 14 slides in the moving direction of the coupling arm 13 with the movement of the coupling arm 13.

A driving arm 15 for driving the rotation of the field masks 6 is located below the link 14. The Fork 14b formed at the other end of the link 14 engages with a coupling pin 15a fixed to one end of the driving arm 15. Interlocked with the movement of the link 14, the driving arm 15 slides in the moving direction of the link 14.

Figure 3:
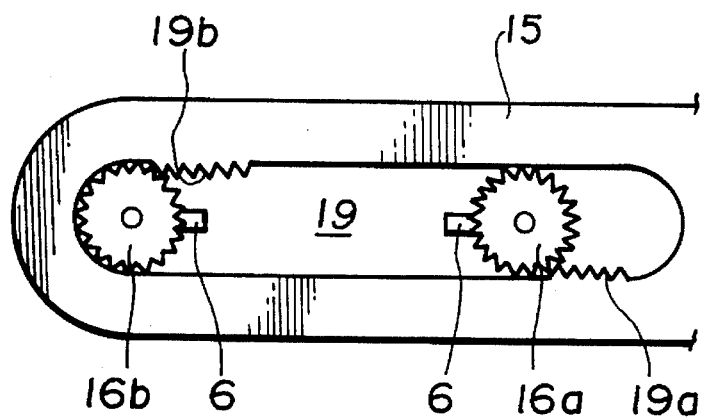
FIG. 3 is an enlarged side view of a free edge of a driving arm in the first embodiment.

FIG. 3 is an enlarged side view of a free edge of the driving arm 15.

An elongated guide hole 19 is bored in the middle of a free edge of the driving arm 15 along the longitudinal axis of the driving arm 15, internal gears 19a and 19b are formed on the tower inner surface of one end of the elongated guide hole 19 and on the upper inner surface of the other end thereof. Two mask driving gears 16a and 16b, which rotate together with the two field masks 6, are fitted in the elongated guide hole 19 so that they will engage with the internal gears 19a and 19b. The other portions of the inner surface of the elongated guide hole 19 except those on which the internal gears 19a and 19b are formed are designed to minimize frictional force, which therefore do not interfere with the movement of the gears 16a and 16b.

The two field masks 6 are held in a viewfinder holding frame, which is not shown, having rotation axes 20 that rotate together with the field masks 6 in such a manner that they can swivel around the rotation axes 20. The mask driving gears 16a and 16b, which rotate together with the rotation axes 20, are each attached to one end of an associated one of the rotation axes 20. The field masks 6 are moved selectively to a position at which they lie above the focusing screen 5 and a position at which they are opposed to each other outside the field of view in the viewfinder.

The internal gears 19a and 19b on the inner surface of the elongated guide hole 19 are located in the upper and lower parts of the ends of the elongated guide hole 19. The mask driving gears 16a and 16b engaging with the internal gears 19a and 19b therefore rotate in mutually opposite directions with the sliding of the driving arm 15. Interlocked with the sliding of the picture size select switch 12, the mask driving gears 16a and 16b rotate in mutually opposite directions. The rotation causes the rotation axes 20 and field masks 6, which rotate together with the gears 16a and 16b, to rotate. Interlocked with the picture size selects witch 12, the field masks 6 thus come in or out of the field of view in the viewfinder.

A projection 14c descends from the middle of the link 14. The tip of the projection 14c is in contact with a photography mode select detection switch 27 that is a leaf-spring switch. Interlocked with the sliding of the link 14; that is, the sliding of the picture size select switch 12, the projection 14c turns on or off the photography mode select detection switch 27. The output of the photography mode select detection switch 27 is red to a CPU 21. Based on the output, the CPU 21 changes the locations of the film screen masks, records information concerning a photography mode in film having a magnetic recording area, displays an alarm, and so on.

Next, the field masks 6 in the first embodiment will be described.

Figure 4:
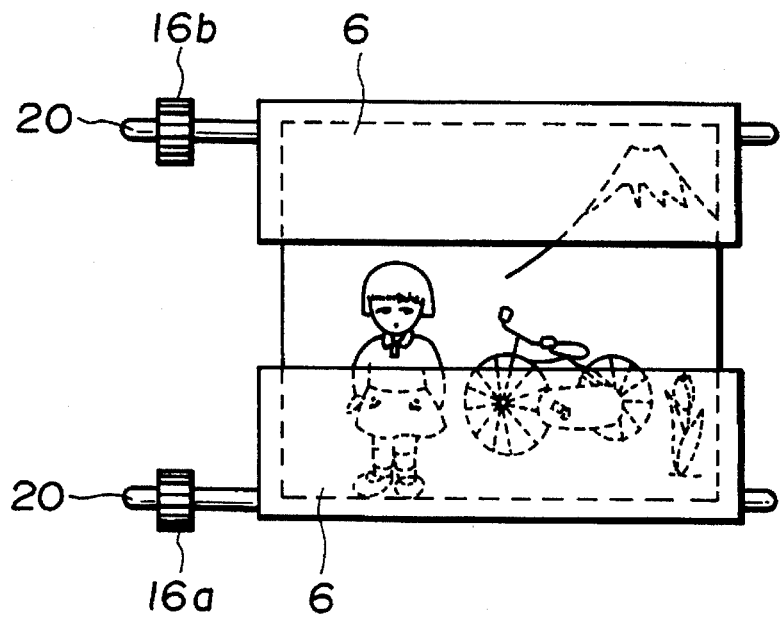
FIG. 4 is a front view showing a field of view in a viewfinder shielded with the field masks in the first embodiment.

FIG. 4 is a front view showing the field of view in a viewfinder shielded with the field masks 6 in the first embodiment.

The field masks 6, unlike conventional field masks that intercept light completely, are made of a translucent material having a transmittance of 20 to 50%. The translucent material is, for example, a plate-like acrylic resin coated with a translucent firm having a neutral color. The field masks 6 can provide the field of view in a viewfinder that permits simultaneous observation of not only a picture range actually printed but also its surrounding areas. Framing can therefore be performed easily. Moreover, a photographer is saved from failing in photography because he/she forgets to change picture sizes and misidentifies a currently selected size as the normal size.

Figure 5:
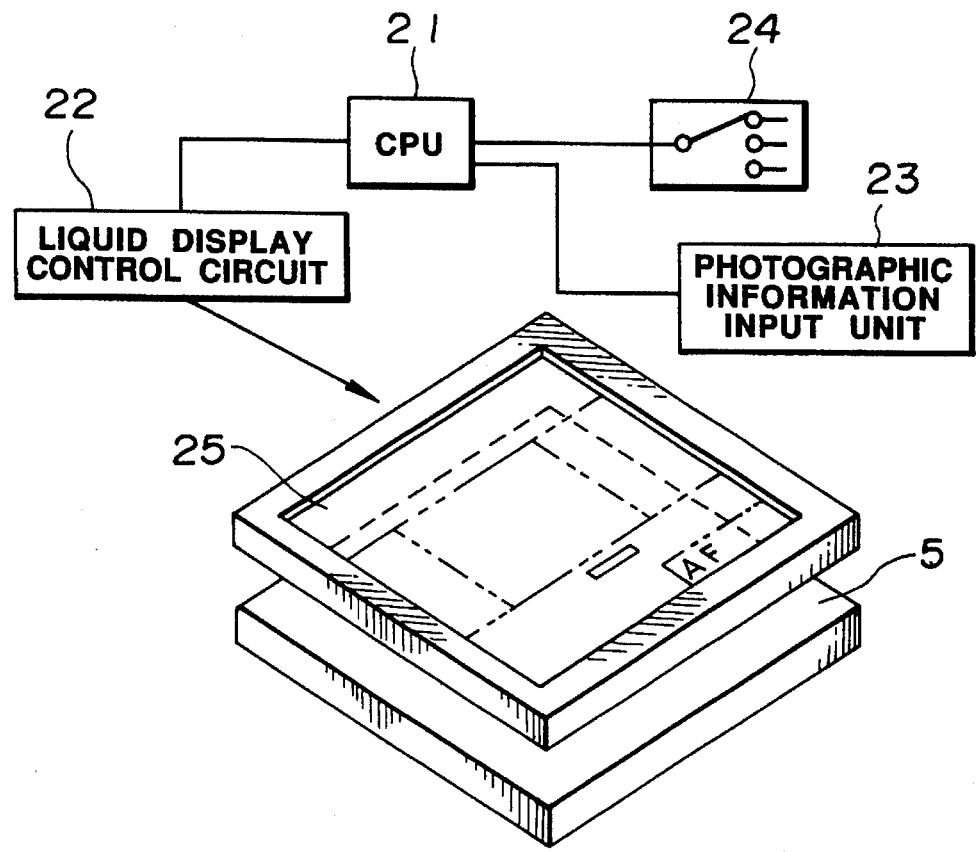
FIG. 5 is a block diagram showing a major portion of a picture size selective camera of a second embodiment of the present invention, and an enlarged oblique view of the major portion.

FIG. 5 is a block diagram showing a major portion of a picture size selective camera of the second embodiment of the present invention, and an enlarged oblique view of the major portion.

In the second embodiment, a liquid crystal display is employed on behalf of the mechanical field masks 6 in the first embodiment.

A picture size select signal representing, for example, a signal for selecting a normal photography mode, panoramic photography mode (corresponding to FIG. 48A), or a double zoom mode (corresponding to FIG. 48B) is transmitted as the output of a photography mode select switch 24 to the CPU 21. The CPU 21 generates a drive signal to be sent to a liquid crystal display control circuit 22 according to the picture size select signal, and thus controls the voltage to be applied to the electrodes of the liquid crystal display 25.

The display section of the liquid crystal display 25 is segmented into multiple zones indicated with a dotted line, dot-dash line, and alternate long and two short dashes line in FIG. 5. Depending on a selected picture range used for printing, the transmittance of each zone can be varied. The liquid crystal display 25 is located above the focusing screen 5; that is, near the image formation surface on which an object image is formed. The liquid crystal display 25 can be used for not only distinguishing a picture range according to the aforesaid method but also displaying information sent from a photographic information input unit 23. Specifically, the liquid crystal display 25 can also display information concerning photography; such as, a hand tremor alarm, a shutter speed, a focusing disabled alarm, a picture frame count, and so on at the same time.

The liquid crystal display 25 can, as already known, not only switch states between light transmission and non-transmission but also modify the transmittance to an intermediate level. The liquid crystal display 25 can thus not only distinguish a range to be used for printing but also control the quantity of light so that the surrounding areas of the range will be discernible. An easy-to-use framing viewfinder can thus be realized.

Figure 6:
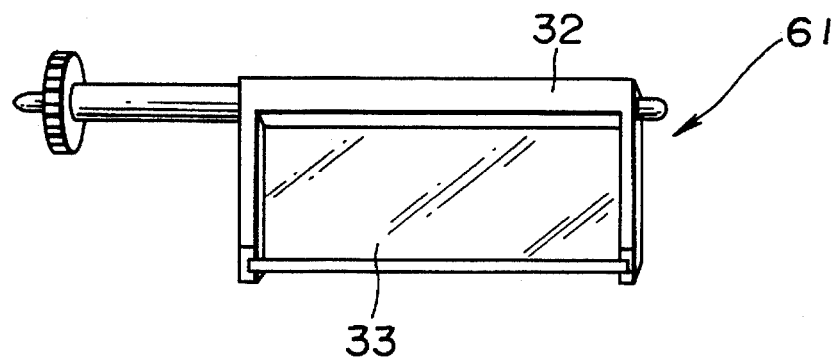
FIG. 6 is a front view of a field mask in a picture size selective camera representing a third embodiment of the present invention.

FIG. 6 is a front view showing one field mask for use in a camera of the third embodiment of the present invention.

Field masks 61 in the third embodiment are a variant of the field masks 6 in the aforesaid first embodiment. Color-coated transparent masks 33 are locked in mask frames 32. Alternatively, the masks may be made of colored plastic. Using colored field masks, the whole field of view can be observed with a sufficient quantity of light. This helps prevent misidentification of a photography mode.

The third embodiment can apply to the first embodiment as mentioned above and can be realized using the liquid crystal display 25 (See FIG. 5) in the second embodiment. That is to say, when a color liquid crystal display is used instead of a monochrome liquid crystal display which has been employed generally in the past, zones equivalent to field masks can be displayed in color.

Figure 7:
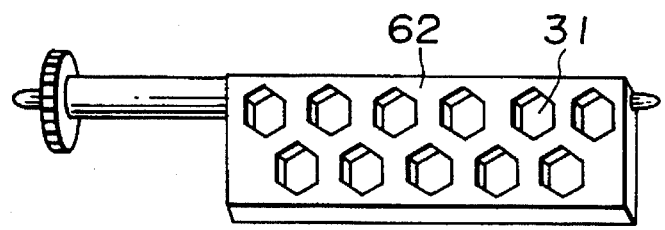
FIG. 7 is a front view of a field mask in a picture size selective camera representing a fourth embodiment of the present invention.

FIG. 7 is a front view of one of field masks in a camera of the fourth embodiment that are another variant of the field masks in the first embodiment.

The fourth embodiment includes field masks 62 which substitute for translucent or color field masks and which transmit light in some areas but do not transmit light in the other areas.

The field masks 62 can be made by molding a resin or machining a thin metallic plate. In FIG. 7, ray transmission areas are hexagonal holes 31. The holes need not have a hexagonal shape but may be any other shape. The smaller holes 31 enable easier observation of an image on a focusing screen as opposed to examining the field through the field masks.

The fourth embodiment, similar to the third embodiment, need not be mechanical field masks but can be realized by forming transmission and non-transmission zones alternately in the liquid crystal display 25 (See FIG. 5) in the second embodiment.

The aforesaid embodiments have been described on the assumption that they are implemented in a viewfinder optical system including a pentagonal roof prism in a single-lens reflex camera. Needless to say, the embodiments can apply to an external-metering viewfinder, which is often adopted for a leaf-shutter type camera, based on exactly the same concept.

Figure 8:
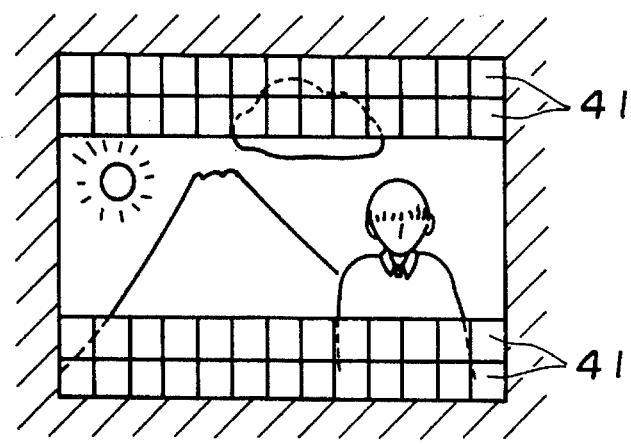
FIG. 8 is a front view of a field mask in a picture size selective camera representing a fifth embodiment of the present invention.
Figure 9:
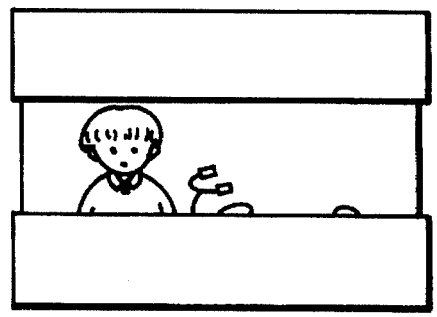
FIG. 9 is a front view showing an example of the field of view in a viewfinder shielded with conventional field masks.

FIG. 8 is a front view showing field masks in a picture size selective camera representing the fifth embodiment of the present invention.

In the fifth embodiment, when the photography mode of a pseudo-panorama size is selected, LCDs 41 display grid masks. Owing to the grid structure, a composition can be set easily and missing pinholes of the LCDs 41 become indiscernible. The costs of LCDs themselves can be held low.

As described so far, the aforesaid embodiments can provide a picture size selective camera including a viewfinder that when a picture size is selected and photography is performed, enables easy recognition of the field of view.

Next, the sixth embodiment of the present invention will be described.

A camera of the sixth embodiment has substantially the same components as those that of the first embodiment shown in FIGS. 1 to 3 has except for the field masks.

Figure 10:
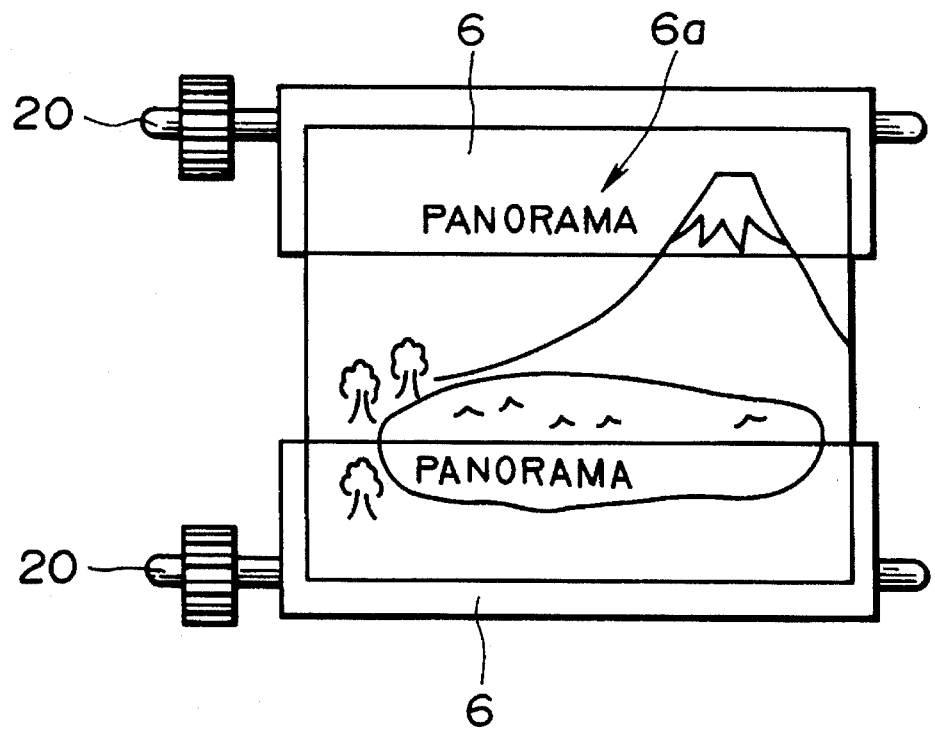
FIG. 10 is a front view showing a viewfinder field shielded with field masks of a sixth embodiment of the present invention.

FIG. 10 is a front view showing the field of view in a viewfinder shielded with the field masks 6.

The field masks 6 in the sixth embodiment, unlike conventional field masks that intercept light completely, are made of a transparent material. The transparent material is, for example, a plate-type acrylic resin. Indicators 6a for distinguishing a picture range are formed along the inner edges of the field masks 6. The indicators indicate, for example, a photography mode name and may be printed on the field masks in such a manner as PANORAMA.

The foregoing field masks 6 provide the field of view in a viewfinder that enables easy observation of not only a picture range to be printed actually but also its surrounding areas. Framing can therefore be achieved effortlessly, and a photography mode can be identified immediately. A photographer will be saved from failing in photography because he/she forgets having changed picture sizes and misidentifies a current picture size as the normal picture size.

Next, exposure to be done when a picture size is selected will be described.

In FIG. 1, the photomerry member 9 meters an exposure value for photography. A beam reflected from an object image formed on the focusing screen 5 passes through the pentagonal roof prism 7 and then enters a light-receiving element in the photomerry member 9.

For selecting a picture size, as described previously, the field masks 6 are inserted to or extracted from the focusing screen by sliding the picture size select switch 12. When photography is performed in the panoramic photography mode, the field masks 6 are inserted in the focusing screen while being interlocked with the sliding of the picture size select switch 12. Nevertheless, since the field masks 6 are made of a transparent material, a metered value is obtained unaffected by the selection of a photography mode and an exposure value is calculated correctly.

Figure 11:
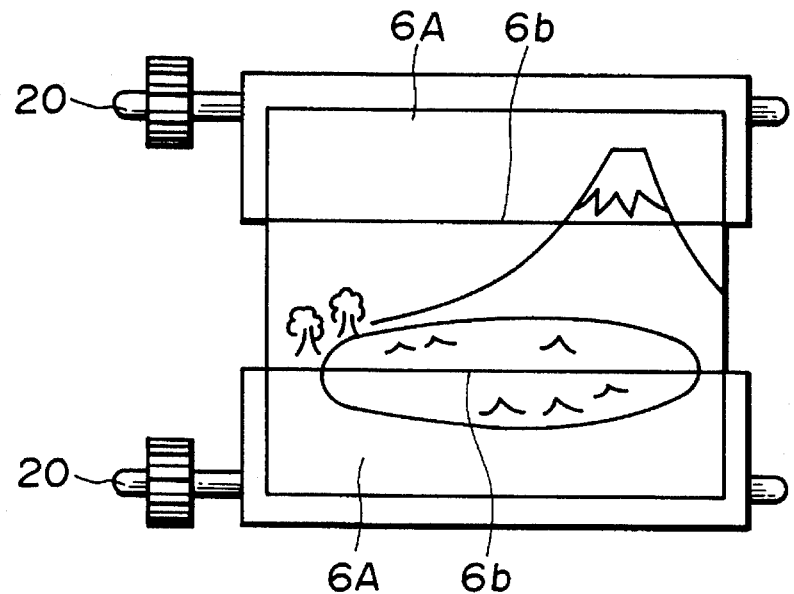
FIG. 11 is a front view showing the field of view in a viewfinder shielded with field masks in a camera of a seventh embodiment of the present invention.

FIG. 11 shows the field of view in a viewfinder in a picture size selective camera representing the seventh embodiment of the present invention.

The only difference of the seventh embodiment from the sixth embodiment lies in the field masks. The other members or components are identical to those in the sixth embodiment. The field masks alone will be described below.

Field masks 6A in the seventh embodiment differ from conventional field masks that intercept light completely. The field masks 6A are, similar to those in the sixth embodiment, made of a transparent material. Indicators 6b for distinguishing a picture range are formed along the inner edges of the field masks 6A. The indicators 6b are, for example, black lines printed along the inner edges of the field masks. As described In the sixth embodiment, a photography mode name, for example, may also be printed on the field masks in such a manner as PANORAMA.

Using the field masks 6A in the seventh embodiment, a picture range to be actually printed can be clearly displayed. Besides, the fact that the panoramic photography mode is currently selected is recognized immediately. Moreover, the field of view in the viewfinder, which enables simultaneous observation of a picture range to be used for printing and its surrounding areas alike, is easily made available. Similar to the aforesaid embodiments, framing can be achieved effortlessly. A photographer will be saved from failing in photography because he/she forgets having changed picture sizes and misidentifies a current picture size as the normal size.

Figure 12:
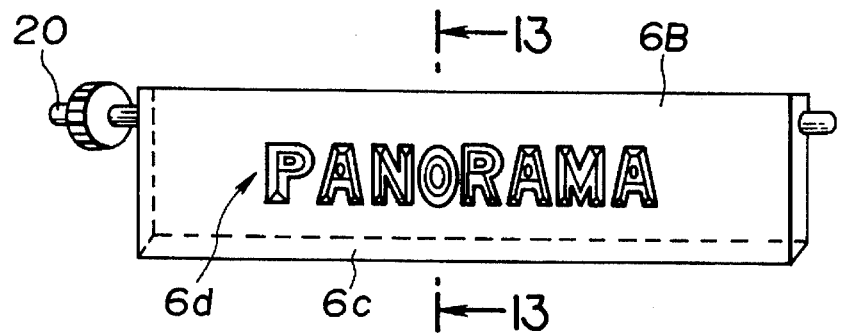
FIG. 12 is an enlarged oblique view showing one of field masks in a camera of an eighth embodiment of the present invention.

FIGS. 11 and 12 show field masks in a picture size selective camera representing the eighth embodiment of the present invention.

The only a difference of the eighth embodiment from the sixth and seventh embodiments lies in the field masks. The other members or components are identical to those in the sixth embodiment. The field masks alone will be described below.

Field masks 6B in the eighth embodiment are, unlike conventional field masks that intercept light completely, similar to those in the sixth and seventh embodiments, made of a transparent material. Indicators 6c and 6d for distinguishing a picture range are formed along the inner edges and centers of the field masks 6B. The indicators 6c and 6d are, unlike those in the sixth and seventh embodiments, not printed on the field masks but formed with inclined planes that reflect light toward the front or back surfaces of the field masks.

Figure 13:
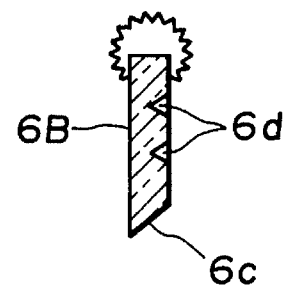
FIG. 13 is a section of the field mask in FIG. 12 looking in the direction of arrows 13—13.

As shown in FIG. 13, the indicators 6c are inclined planes on the inner edges of field masks. Each of the indicators 6d consists of inclined planes engraved on the back surface of each of the field masks 6B to form characters of a photography mode name such as PANORAMA. When inclined planes are thus used, part or the whole of rays entering the field masks is reflected from the inclined planes of the indicators 6c and 6d. The quantities of light transmitted by the indicators 6c and 6d thus differ from those in the surrounding areas. Consequently, both or either of the indicators 6c and 6d appear to be floating on the transparent field masks.

With the above structure, the boundaries of a picture range to be used for printing and a photography mode name such as PANORAMA can be displayed clearly on the field masks without using expensive printing.

The eighth embodiment as well as the sixth and seventh embodiments provides the field of view in a viewfinder that enables simultaneous observation of a picture range to be actually printed and its surrounding areas alike. Framing can therefore be achieved effortlessly. A photographer will be saved from failing in photography because he/she forgets having changed picture sized and misidentifies a current picture size as the normal size.

In the eighth embodiment, indicators that are boundaries indicating a panorama mode and characters of PANORAMA are formed with inclined surfaces, and thus the quantity of transmitted light is made different from the indicators to their surrounding areas. The indicators therefore appear to be floating. Alternatively, the front or back surfaces of indicators may be made as irregular roughened surfaces. Thus, the quantities of transmitted light decrease and become different from those in the surrounding areas. Consequently, the indicators become discernible.

As described above, when field masks are made of a transparent material, a metered value of an object will be obtained unaffected by the selection of a photography mode and an exposure can be calculated correctly. Another remarkable advantage Is that a picture range for the trimming photography mode and a mode state can be displayed clearly.

Next, the ninth embodiment of the present invention will be described.

Figure 14:
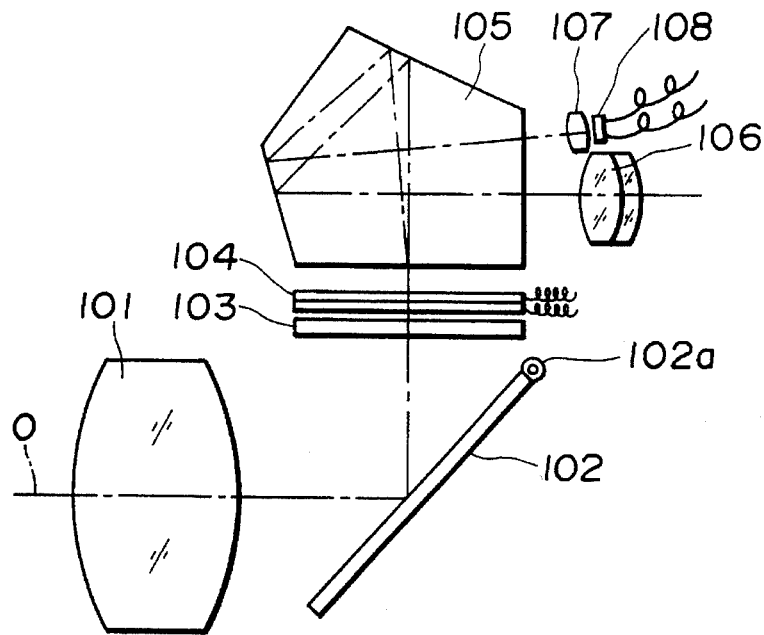
FIG. 14 is a schematic sectional view showing an optical system in a single-lens reflex camera enabling selection of a normal photography mode or a trimming photography mode and representing a ninth embodiment of the present invention.

FIG. 14 is a schematic diagram showing the components of an optical system in a single-lens reflex camera permitting trimming photography and representing the ninth embodiment of the present invention.

A movable reflecting mirror 102, which is a component of a viewfinder optical system, is placed at an angle of 45° behind a lens array 101, which is held in a lens barrel in a camera body, along the optical axis of the lens array 101, so that the upper end 102a thereof can rotate freely. A focusing screen 103, on which an object image emerging from the lens array 101 is formed, is located above the movable reflecting mirror 102. An LCD panel 104, which serve as viewfinder field masks for setting the field of view in the viewfinder to a field range of a normal picture size or a field range of a smaller picture size for trimming photography, are located immediately above and close to the focusing screen 103.

Figures 15A, 15B, 15C:
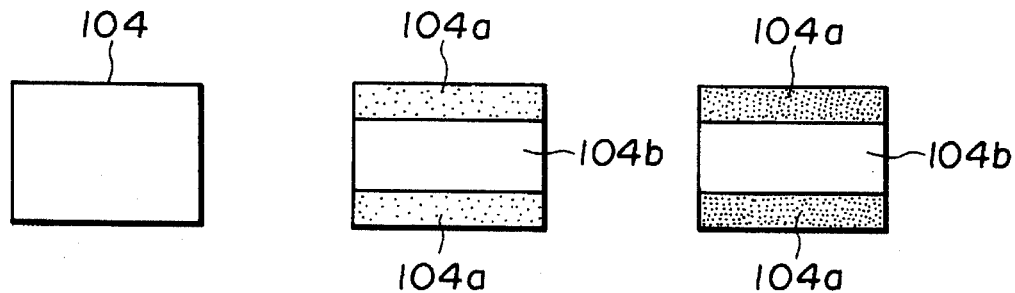
FIGS. 15A, 15B, and 15C are front views showing an LCD panel which is set to a state for normal photography, a high-transmittance state for trimming photography, and a low-transmittance state for trimming photography.

The LCD panel 104 can be changed among, as shown in FIGS. 15A, 15B, and 15C, the state for a normal photography mode and two states for a trimming photography mode, or a total of three states. Specifically, in the normal photography mode, as shown in FIG. 15A, the whole of the LCD panel 104 becomes transparent. In the trimming photography mode, as shown in FIGS. 15B and 15C, zones 104a (hereinafter, trimming mask zones) or the upper and lower band-like parts (hereinafter, trimming masks) corresponding to the trimmed focusing screen on the LCD panel 104 are changed between a state in which they are translucent because of a fine dot pattern and have large transmittances (hereinafter, high-transmittance state) (FIG. 15B) or a state in which a ratio of transmitted light to entire light is low because of a high dot density or the light transmittances are small (hereinafter, low-transmittance state) (FIG. 15C).

In this embodiment, so-called panoramic photography, in which the lateral dimension of a picture size is the same as that for normal photography but the longitudinal dimension thereof is smaller than that for normal photography, is described as trimming photography.

Returning to FIG. 14, a pentagonal roof prism 105 is located above the LCD panel 104. An eyepiece lens 106 is located behind the pentagonal roof prism 105. A photomerry lens 107 for metering a luminance of an object is located behind the pentagonal roof prism 105 in the vicinity of the eyepiece lens 106. A photomerry light-receiving element 108 is located behind the photomerry lens 107.

In a camera permitting trimming photography and including an optical system having the foregoing components, a beam reflected from an object and transmitted by the lens array 101 is reflected upward by the movable reflecting mirror 102 inclined with respect to the optical axis of the optical system. The beam then forms an object image on the focusing screen 103. In the normal photography mode, the object image is observed through the eyepiece lens 106 via the LCD panel 104 that is fully transparent.

The beam from the object image on the focusing screen 103 is converged on the photomerry light-receiving element 108 by the photomerry lens 107 located behind the pentagonal roof prism 105. The luminance of the object image is then metered. The photomerry lens 107 and photomerry light-receiving element 108 are arranged so that the photometric range will coincide with the whole or substantially the whole of the focusing screen 103 which corresponds to the standard picture range in the normal photography mode.

The field of view in the viewfinder In the trimming photography mode is restricted by the LCD panel 104 located above the focusing screen 103. In the normal photography mode, as shown in FIG. 15A, the whole of the LCD panel 104 corresponding to the whole of the focusing screen 103 becomes transparent. Observation of an object image and photometry of an object are carried out on the whole of the focusing screen 103.

In contrast, when photomerry is performed in the trimming photography mode, as shown In FIGS. 15B and 15C, the LCD panel 104 is driven so that the field of view in the viewfinder will agree with a trimming zone and the trimming mask zones 104a will be changed alternately between the high-transmittance state (FIG. 15B) and the low-transmittance state (FIG. 15C). The trimming zone 104b of the LCD panel 104 transmits the optical image of the object on the focusing screen 103 as it is. However, the trimming mask zones 104a of the LCD panel 104 alleviate the light intensity of the optical image.

The portion of the object image on the focusing screen 103 transmitted by the trimming zone 104b can therefore be observed clearly through the eyepiece lens 106, while the portions of the object image transmitted by the trimming mask zones 104a are observed darker than that transmitted by the trimming mask zone 104b through the eyepiece lens 106. In the trimming photography mode, a quantity of light converging on the light-receiving element 108 after transmission by the whole of the LCD panel including the trimming mask zones 104aa is larger than that converged on the light-receiving element 108 after transmission by the trimming zone 104ab.

Figure 16:
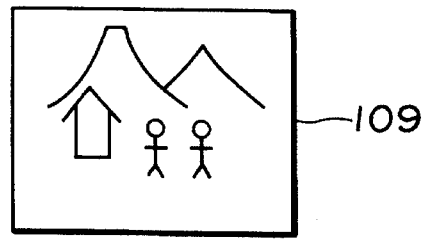
FIG. 16 is a front view showing an object image in a viewfinder in a normal photography mode and the field of view in the viewfinder in the ninth embodiment.
Figure 17A:
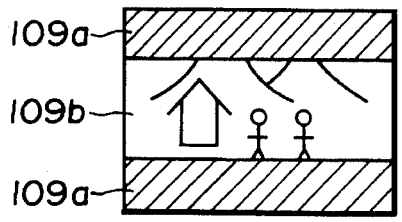
FIGS. 17A and 17B are front views showing an object image in a viewfinder and the field of view in the viewfinder in the high-transmittance and low-transmittance states in the trimming photography mode in the ninth embodiment.
Figure 17B:
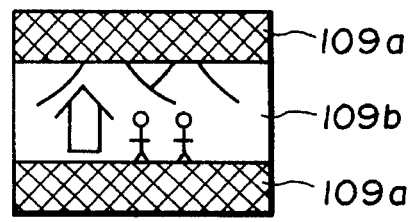

FIGS. 16, and 17A and 17B show objects seen in a viewfinder and the field of view in the viewfinder in the normal photography mode and trimming photography mode. In the normal photography mode, as shown in FIG. 16, the whole of the focusing screen 103 corresponds to the field of view in the viewfinder 9. A photographer observes the field of view in the viewfinder 9. In the trimming photography mode, the trimming mask zones of the field of view in the viewfinder changes between the high-transmittance state (FIG. 17A) and low-transmittance state (FIG. 17B) in correspondence with the states of the LCD panel 104.

As shown in FIG. 17A, when trimming mask zones 109a in the viewfinder are placed in the high-transmittance state, objects are observed in the whole field of view in the viewfinder in such a state that the trimming mask zones 109a are slightly darker than a trimming zone 109b. After the LCD panel 104 is changed to the other state, as shown in FIG. 17B, when the trimming mask zones 109a in the viewfinder are placed in the low-transmittance state, the objects are observed in the whole field of view in the viewfinder in such a state that the zones 109a are darker than the trimming zone 109b.

In the trimming photography mode, the trimming mask zones 104aa of the LCD panel 104 are changed alternately between the high-transmittance and low-transmittance states. The trimming mask zones 109a, which are shown in FIGS. 17A and 17B, in the viewfinder are also changed alternately between the high-transmittance state shown in FIG. 17A and the low-transmittance state shown in FIG. 17B.

Photomerry in the normal photography mode is carried out when the whole of the LCD panel 104 is in the transparent state. For example, when a photometric method of average photometry is adopted, photomerry is performed on the whole of the viewfinder. Photomerry in the trimming photography mode is carried out when the trimming mask zones 104aa of the LCD panel are in the high-transmittance and low-transmittance states respectively. A quantity of light to be metered in the trimming photography mode; that is, a quantity of light converged on the photomerry light-receiving element 108 is slightly lower than that in the normal photography mode because of the shading dot pattern. The quantity of light to be metered in the trimming photography mode is, however, slightly larger than that when the trimming mask zones 104aa of the LCD panel are made of a material that intercepts light completely.

Figure 18:
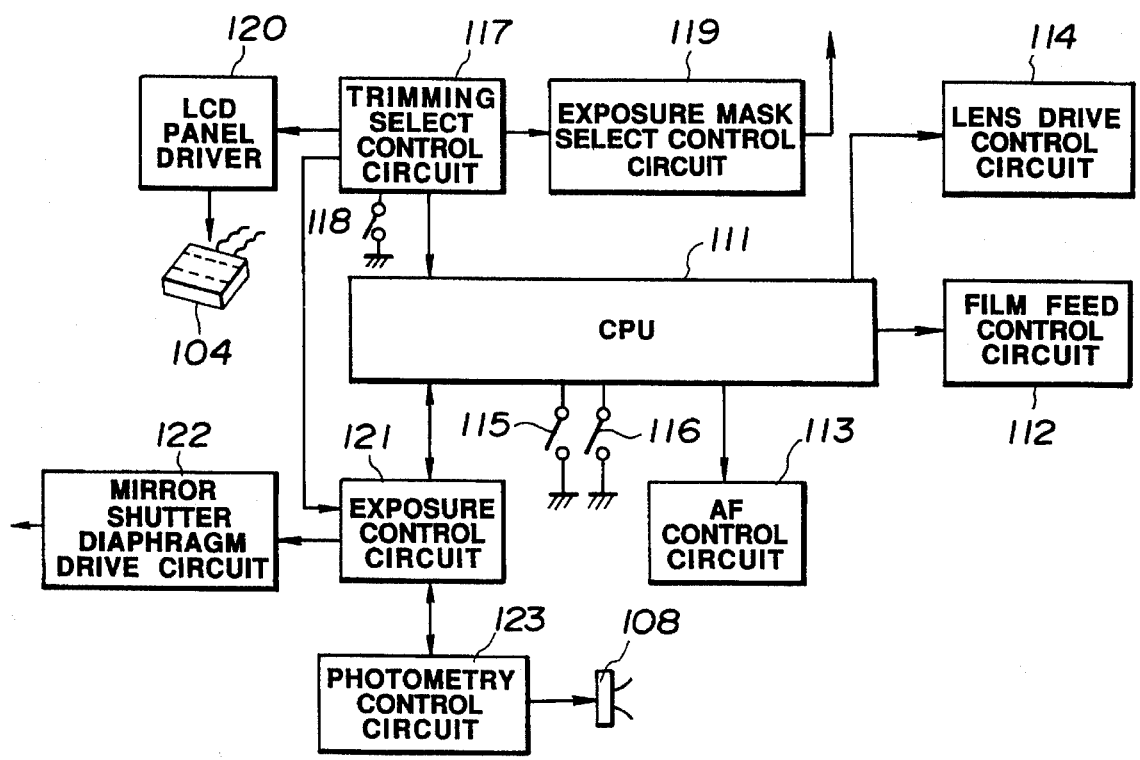
FIG. 18 is a schematic block diagram showing a circuitry of a camera of the ninth embodiment.

FIG. 18 is a block diagram showing an arrangement of electric circuits incorporated in a camera permitting trimming photography of this embodiment.

A CPU 111 for controlling the operation of the camera outputs a signal for controlling film wind or rewind to a film-feed control circuit 112, a signal for controlling auto-focusing to an auto-focusing control circuit 113, and a signal for driving a zoom/focus lens in a lens array (See FIG. 14) to a lens drive control circuit 114. A switch 115 for starting auto-focusing and a switch 116 for starting an exposure sequence after auto-focusing is completed are connected to the CPU 111. The other terminals of the switches 115 and 116 are grounded.

A switch 118 for selecting the normal photography mode or trimming photography mode is connected to a trimming select control circuit 117. The other terminal of the switch 118 is grounded. A mode select signal supplied with the make of the switch 118 is fed from the trimming select control circuit 117 to the CPU 111.

A trimming select control signal sent from the trimming select control circuit 117 is output to an exposure mask select control circuit 119. An exposure mask select control signal sent from the exposure mask select control circuit 119 is output to film exposure mask members, which are not shown, and their driving system. A film exposure range is then selected.

The trimming select control signal sent from the trimming select control circuit 117 is output to an LCD panel driver 120. When the LCD panel driver 120 drives the LCD panel 104, the LCD panel 104 changes the field of view in the viewfinder.

The CPU 111 supplies a signal for controlling exposure to the exposure control circuit 121. The trimming select control signal sent from the trimming select control circuit 117 is also supplied to the exposure control circuit 121. The exposure control circuit 121 outputs a signal for driving the mirror, shutter, and diaphragm to a mirror/shutter/diaphragm drive circuit 122. The drive circuit 122 drives the mirror, shutter, and diaphragm which are not shown. The exposure control circuit 121 outputs an exposure control signal for controlling photomerry to a photomerry control circuit 123. The photomerry control circuit 123 supplies an object luminance value metered by the photomerry light-receiving element 108 to the CPU 111 via the exposure control circuit 121.

The exposure control circuit determines a shutter speed and an f-number using the metered value provided by the photomerry light-receiving element 108. In the normal photography, mode, the exposure control circuit 121 calculates a shutter speed and an f-number on the basis of the parameters for the normal photography mode using a metered value resulting from photomerry performed on the whole range of the viewfinder, and thus controls exposure.

Figures 19A, 19B:
FIGS. 19A and 19B are front views showing an LCD panel in the high-transmittance and low-transmittance states for explaining a method of calculating photometric data in a trimming picture range in the ninth embodiment.

Next, a calculating means for calculating a photometric value in the trimming photography mode will be described in conjunction with FIGS. 19A and 19B. FIGS. 19A and 19B show examples of calculating a photometric value of a trimming zone a using the metered values resulting from photomerry performed when the trimming mask zones of the LCD panel 104 are in the high-transmittance state (FIG. 19A) and low-transmittance state (FIG. 19B). Assuming that the light current flowing through the photomerry light-receiving element 108 when the trimming mask zones of the LCD panel 104 are in the high-transmittance state is I, the light current flowing therethrough in the low-transmittance state is I', a ratio of the low transmittance to the high transmittance is $\Delta K$, and the light current in the trimming zone a is Ia, if the light current in the high-transmittance zones b is Ib and the light current in the low-transmittance zones b' is Ib', the following equations are established:

$$Ia+Ib=I \quad (1)$$

$$Ia+Ib'=I' \quad (2)$$

$$Ib'/Ib=\Delta K \quad (3)$$

When the equation (2) is assigned to the equation (3):

$$Ia+\Delta K\, Ib=I' \quad (4)$$

When the equation (1) is assigned to the equation (4):

$$Ia+\Delta K(I-Ia)=I'$$

$$Ia(\Delta K-1)=\Delta K\, I-I'$$

$$Ia=(\Delta K\, I-I')/(\Delta K-1)$$

The photometric value (light current value) Ia of the trimming zone is thus calculated using the light current I flowing through the photometry light-receiving element 108 when the trimming mask zones 104a of the LCD panel 104 are in the high-transmittance state, the light current I' flowing therethrough in the low-transmittance state, and the ratio of the low transmittance to the high transmittance.

Figure 20:
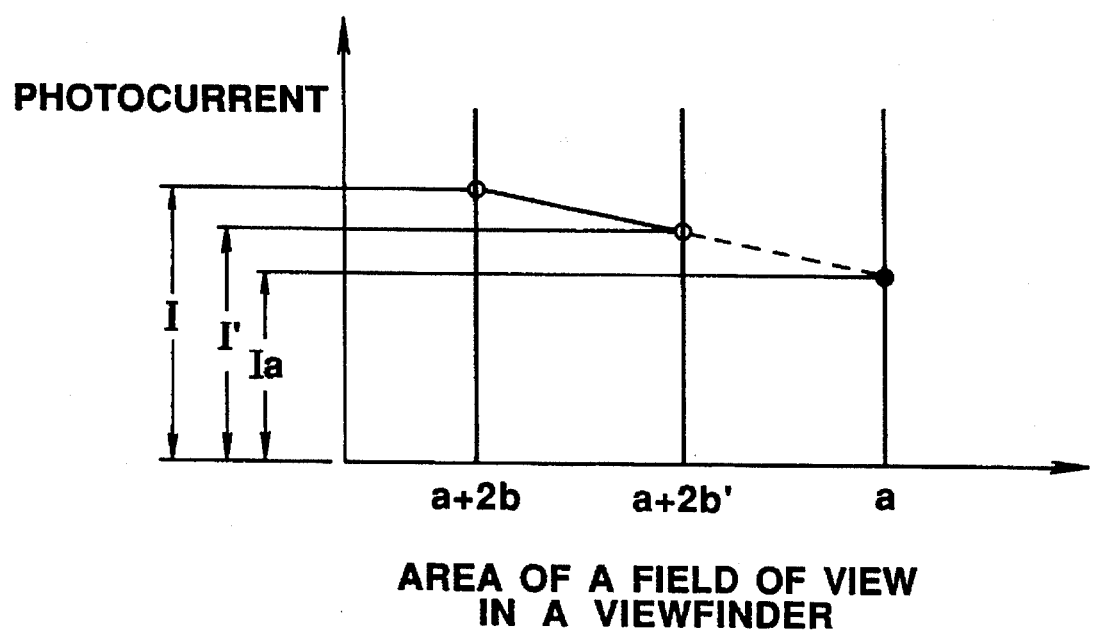
FIG. 20 is a diagram showing a method of calculating photometric data for each of the high-transmittance and low-transmittance stages in FIG. 19.

FIG. 20 is a diagram showing the relationship among the foregoing parameters. The axis of ordinates represents the light current value, and the axis of abscissas represents the area of the zone in the whole viewfinder that transmits light, which is calculated on the assumption that the transmittance of the translucent trimming mask zones is 100 The areas of the trimming mask zones in the high-transmittance state is represented as 2b, and the areas thereof in the low-transmittance state is represented as 2b'. The area of the trimming zone is represented as a. A line linking intersections of the lines representing the areas a+2b and a+2b' with the lines representing the currents I and I' is extended toward the line representing the area a of the trimming zone. A point at which the line linking the intersections crosses the line representing the area a exhibits the light current Ia.

Using the light current Ia, the exposure control circuit 121 calculates a shutter speed and an f-number on the basis of the parameters for the trimming photography mode.

Figure 21:
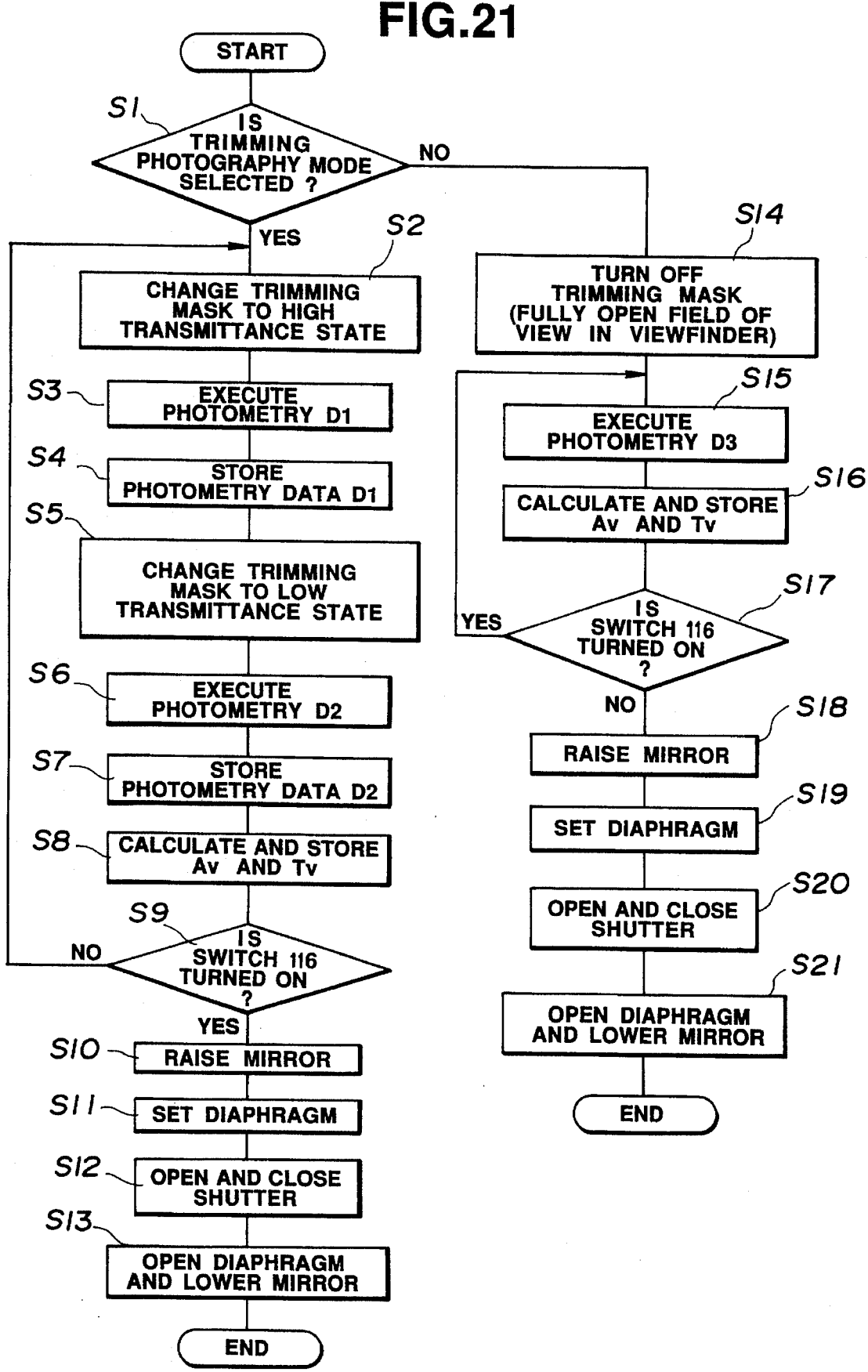
FIG. 21 is a flowchart showing an exposure sequence including photomerry in the camera of the ninth embodiment.

The operation of a camera having the foregoing circuitry will be described in conjunction with the flowchart of FIG. 21. The flowchart shows a subroutine in photomerry. At a step S1 after the sequence starts, it is determined whether the trimming photography mode is selected. If the trimming photography mode is not selected, control is passed to a step S14. If the trimming photography mode is selected, control is passed to a step S2. For selecting the trimming photography mode, the switch 18 (See FIG. 18) is turned on to activate the trimming select control circuit 17.

When the trimming photography mode is selected, the LCD panel 104 is driven at a step S2. The trimming mask zones of the LCD panel 104 are placed in the high-transmittance state. In the high-transmittance state, the first photomerry (D1) is executed on the whole of the viewfinder at a step S3. The metered data D1 resulting from the photomerry is stored in memory in the CPU 111 at a step S4.

At a step S5, the LCD panel. 104 is driven and the trimming mask zones of the LCD panel 104 are changed to the low-transmittance state. In the low-transmittance state, the second photomerry (D2) is executed on the whole of the viewfinder at a step S6. The metered data D2 resulting from the photomerry is stored in the CPU 111 at a step S7. At a step-S8, the metered data DI resulting from the photomerry done when the trimming mask zones are in the high-transmittance state and the metered data D2 resulting from the photomerry done when the trimming mask zones are in the low-transmittance state are used to compute an f-number and a shutter speed. An AV APEX value and TV APEX value corresponding to the computed f-number and shutter speed are stored in a RAM or other memory means which is not shown.

If the switch 116 for starting the exposure sequence (See FIG. 18) is not turned on within a certain period of time at a step S9, control is returned to the step S2. Until the switch 116 Is turned on, the loop of the steps S2 to S9 is repeated. When the switch 116 is turned on and the exposure sequence is enabled, control is passed to step S10. Exposure operations are carried out at the steps S10 to S12. Specifically, at the step S10, the mirror/shutter/diaphragm drive circuit 122 (See FIG. 18) causes the movable reflecting mirror 102 to go up. At the step S11, the diaphragm is set. At the step S12, the shutter is opened and closed. Based on the AV APEX and TV APEX values, the exposure control circuit 121 thus allows the exposure operations for the trimming photography mode to be performed correctly.

When the exposure terminates, the diaphragm becomes open at a step S13. The movable reflecting mirror descends to a specified position. The exposure sequence for the trimming photography mode terminates.

Back to the step S1, if the trimming photography mode is not selected; that is, the normal photography mode is selected, at a step S14, the LCD panel 104 is driven to turn off the trimming mask zones. The whole of the LCD panel 104 then enters the transparent state. In the transparent state, photometry (D3) is executed on the whole of the viewfinder at a step S15. The metered data D3 resulting from the photomerry is used to compute an f-number and a shutter speed. AV APEX and TV APEX values corresponding to the f-number and shutter speed are stored in memory in the CPU 111.

If the switch 116 for starting the exposure sequence (See FIG. 18) is not turned on for a certain period of time at a step S17, control is returned to the step S15. The loop of the steps S15 to S17 is executed so that the photomerry and photometric computation will be repeated until the switch 116 is turned on.

When the switch 116 is turned on and the exposure sequence is enabled, control is passed to the step S18. Exposure operations are carried out at the steps S18 to S20. Specifically, the mirror/shutter/diaphragm drive circuit 122 causes the movable reflecting mirror 102 to go up at the step S18. The diaphragm is set at the step S19. Finally, the shutter is opened and closed at the step S20. Based on the AV APEX and TV APEX values stored In memory in the CPU 111, the exposure control circuit 121 thus allows the exposure operations for the normal photography mode to be performed correctly.

When the exposure terminates, at a step S21, the diaphragm opens and the movable reflecting mirror descends to a specified position. The exposure sequence for the normal photography mode then terminates.

As described above in the ninth embodiment, the photomerry for the trimming photography mode is not oriented to the trimming zone alone but performed on the whole of the viewfinder including the trimming mask zones that are in the translucent state. The photomerry light-receiving element 108 can therefore receive a sufficient quantity of light. Even for an object of low luminance, the luminance limit in the camera does not decrease and the camera performance at the luminance limit remains excellent.

Using the luminance information resulting from photomerry of spotlight transmitted by the trimming mask zones, a photometric value for the trimming zone can be computed correctly. The exposure precision for the trimming zone will therefore not deteriorate. The transmittances for the high-transmittance and low-transmittance states of the trimming mask zones in the trimming photography mode can be set to any values. The transmittances for the high-transmittance and low-transmittance states of the trimming mask zones can therefore be set to such values that make it easy to discern the trimming zone in the viewfinder.

When the difference between the transmittance values for the high-transmittance and low-transmittance states of the trimming mask zones is minimized, a sense of incompatibility between observed images of an object in the viewfinder, which results from alternation between the high-transmittance and low-transmittance states, can be suppressed.

In this embodiment, the transmittances of trimming mask zones of an LCD panel are changed by varying the density of their dot patterns to make the trimming mask zones translucent. The transmittances of the mask zones may be changed by making the trimming mask zones translucent using diffusion.

FIGS. 22, 23, 24, 25, and 26 show the tenth embodiment of the present invention. The tenth embodiment provides a translucency means for changing states of trimming mask zones of an LCD panel.

Figures 22A, 22B, 22C:
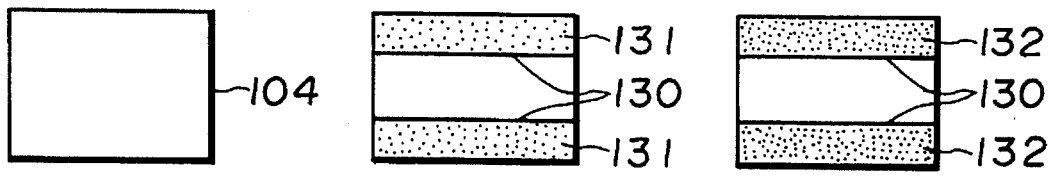
FIGS. 22A, 22B, and 22C are front views showing an LCD panel in a photomerry unit in a tenth embodiment of the present Invention which is set to a state for normal photography, and to high-transmittance and low-transmittance states for trimming photography in which the boundaries of a trimming picture range are distinguished.

FIGS. 22A, 22B, and 22C, etc., and 26A, 26B, and 26C show the LCD panel 104 which is in the fully-transparent state for the normal photography mode, in the state for the trimming photography mode in which the trimming mask zones are in the high-transmittance state, and in the state for the trimming photography mode in which the trimming mask zones are in the low-transmittance state respectively.

In FIG. 22B, the trimming mask zones are in the high-transmittance state 131 for the trimming photography mode. In FIG. 22C, the trimming mask zones are in the low-transmittance state. In these states, the LCD panel 104 displays boundaries 130 of a trimming zone. Even when the transmittances of the trimming mask zones are close to the transmittance of the trimming zone, the boundaries 130 are clearly distinguishable. The trimming zone is therefore accurately discernible.

Figures 23A, 23B, 23C:
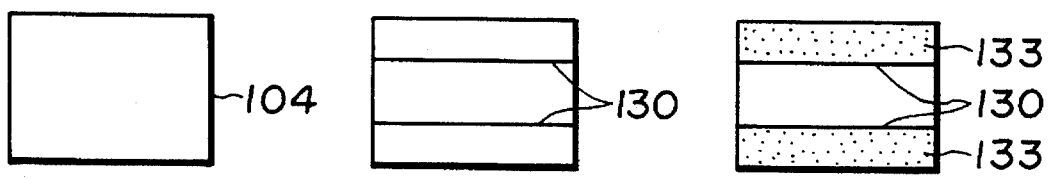
FIGS. 23A, 23B, and 23C are front views showing an LCD panel in the photomerry unit in the tenth embodiment which is set to the state for normal photography, the high-transmittance state for trimming photography in which the boundaries of a trimming picture range alone are distinguished, and the low-transmittance state for trimming photography.

In FIG. 23B, the trimming mask zones are in the high-transmittance state for the trimming photography mode. The LCD panel 104 displays the boundaries 130 of the trimming zone alone. In the low-transmittance state 133 shown in FIG. 23C, the transmittances of the trimming mask zones can be set to the higher values that those in other embodiments of the present invention. The luminance limit defining the lowest value of luminance of an object subjected to photometry therefore need not be lowered. The camera performance at the luminance limit can still be upgraded. In the low-transmittance state, the boundaries of the trimming zone need not be displayed. In the trimming photography mode, the trimming mask zones are changed alternately between the high-transmittance and low-transmittance states and show up in the viewfinder cyclically. A photographer can therefore discern the trimming zone accurately.

Figures 24A, 24B, 24C:
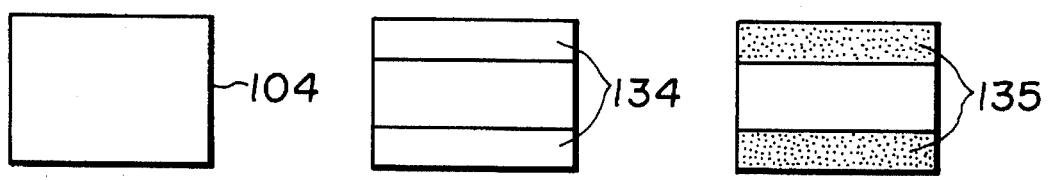
FIGS. 24A, 24B, and 24C are front views showing an LCD panel in the photomerry unit in the tenth embodiment which is set to the state for normal photography, and the high-transmittance and low-transmittance states for trimming photography in which mask plates are employed.

In the high-transmittance state 134 of FIG. 24B, translucent mask plates are inserted in the trimming mask zones for the trimming photography mode, and set to the high-transmittance state 134. In the low-transmittance state 135 of FIG. 24C, the mask plates are present, and the LCD panel 104 is driven to put the trimming mask zones in the translucent state. The transmittance in the translucent state is therefore lower than that in the high-transmittance state 134. A material having a uniform transmittance; such as, an ND filter can be used for the mask plates. This is advantageous because a photographer can easily observe an object in the viewfinder while discerning the trimming zone.

Figures 25A, 25B, 25C:
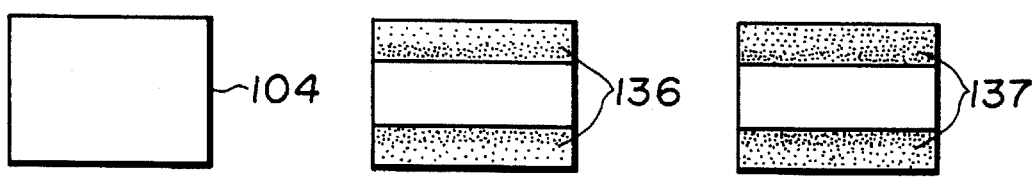
FIGS. 25A, 25B, and 25C are front views showing an LCD panel in the photomerry unit in the tenth embodiment which is set to the state for normal photography, and the high-transmittance and low-transmittance states for trimming photography in which the transmittances along the boundaries of a trimming picture range are decreased.

In the high-transmittance state 136 of FIG. 25B and low-transmittance state 137 of FIG. 25C for the trimming photography mode, the transmittances of the trimming masks are decreased in the vicinities of the boundaries of the trimming zone, and increased gradually as parting from the boundaries. An object image is made indiscernible in the areas in the viewfinder corresponding to the edges of the trimming mask zones along the boundaries. The portion of the object image falling on the trimming zone is made especially clearly discernible during framing for trimming photography.

Figures 26A, 26B, 26C:
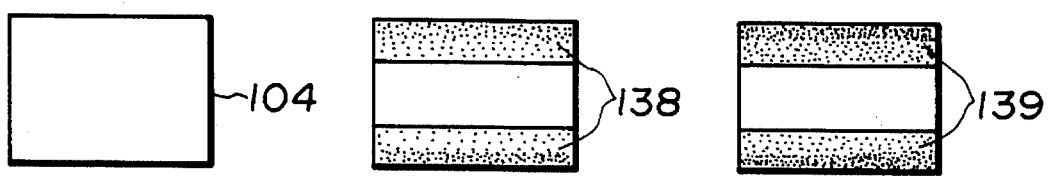
FIGS. 26A, 26B, and 26C are front views showing the field of view in a viewfinder in the photomerry unit in the tenth embodiment which is set to the state for normal photography, and the high-transmittance and low-transmittance states for trimming photography in which the transmittances along the boundaries of a trimming picture range are increased, and an LCD panel in a state during trimming photography with the transmittances by boundaries of a trimming range increased.

FIGS. 26A, 26B, and 26C are based on the idea opposed to that in FIGS. 25A, 25B, and 25C. In the high-transmittance state of FIG. 26B and low-transmittance state of FIG. 26C for the trimming photography mode, the transmittances of the edges the trimming mask zones along the boundaries of the trimming zone, which are referenced for framing during trimming photography, are increased but those departing from the boundaries, which are not referenced greatly, are decreased. When the field of view for trimming photography is determined, the portion of an object image surrounding the trimming zone is thus made discernible so that the framing for trimming photography can be done easily.

FIGS. 27A, 27B, and 27C, and 28 show a translucency means for changing the states of the viewfinder between normal photography and trimming photography in a photomerry unit representing the eleventh embodiment of the present invention.

Figures 27A, 27B, 27C:
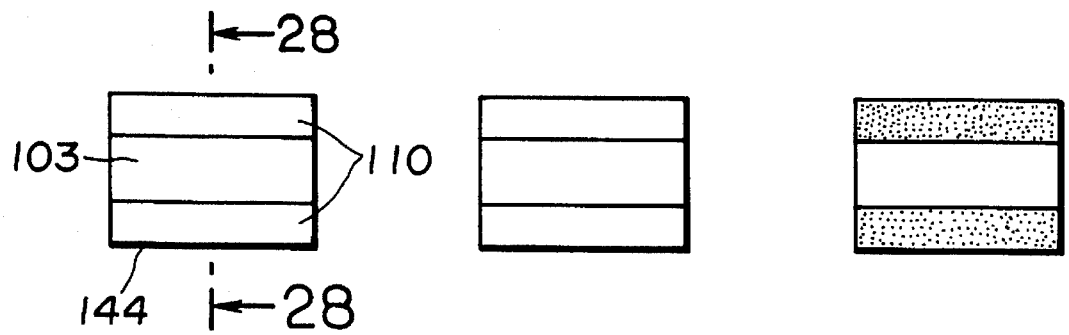
FIGS. 27A, 27B, and 27C are front views showing an LCD panel of a translucency means in the photomerry unit in the tenth embodiment during normal photography which is set to the state for normal photography, and the high-transmittance and low-transmittance states for trimming photography.
Figure 28:
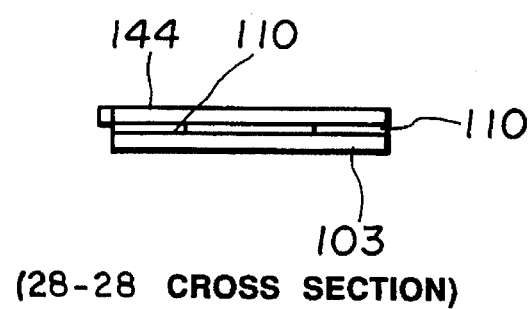
FIG. 28 shows a section of the translucency means in FIG. 27 looking in the direction of arrows 28—28.

FIGS. 27A, 27B, and 27C show the translucency means in the ninth embodiment which is in the fully-transparent state for the normal photography mode, in the high-transmittance state for the trimming photography mode, and in the low-transmittance state for the trimming photography mode. FIG. 28 shows an E—E' section of the translucency means shown in FIG. 27A.

Trimming members 110 shown in FIG. 28 are located immediately above the focusing screen 103 shown in FIG. 14 and within the trimming mask zones. The LCD panel 144 is located immediately above the trimming members 110.

The trimming members 110 have slightly smaller transmittances than the focusing screen 103. In the eleventh embodiment, a thin plate of an ND filter is used for the trimming members 110. Alternatively, the trimming members 110 may be colored members whose transmittances are decreased using dot patterns that are not uniform. The trimming members are not installed independently of other components but may be printed on the focusing screen 103 or the transparent surface of the LCD panel 144, or united with it by coloring. The trimming members 110 may be located at any positions in the vicinity of the focusing screens 103 on which an object image is formed by a lens array which is not shown.

The LCD panel 144 can be controlled so that the LCD panel 144 can be changed between two states; a state in which the trimming mask zones are transparent and a state in which the trimming mask zones have small transmittances.

The operation of the foregoing translucency means will be described. FIG. 27A shows a state of the translucency means in the normal photography mode. In the normal photography mode, the trimming members 110 cause the transmittances of the trimming mask zones to become smaller than the transmittance of the trimming zone. In the normal photography mode, the trimming zone for the trimming photography mode can be identified. However, the transmittances of the trimming members 110 are set to such value that will not obstruct the observation of an object image appearing in the whole field of view in the viewfinder in the normal photography mode. Experiments have revealed that for example, when the trimming members 110 have the characteristic of an ND filter, transmittances from −0.3 to 0.6 EV (81 to 66%) are effective.

In the normal photography mode, framing of the whole of the viewfinder can be done thoroughly and framing for the trimming photography mode can be done at the same time. While observing an object image, a photographer can therefore determine which of the normal photography mode or trimming photography mode is more effective.

FIGS. 27B and 27C show the translucency means which is in the high-transmittance and low-transmittance states for the trimming photography mode. In the high-transmittance state of FIG. 27B. The LCD panel 144 is not driven and the trimming mask zones are transparent. The translucency means is in the same state as that in the normal photography mode shown in FIG. 27A. In the low-transmittance state of FIG. 27C, the LCD panel 144 is driven to change the dot patterns of the trimming masks. The trimming mask zones are then placed in the translucent state. The translucency means has therefore entered a state in which the transmittance of the translucency means is lower than the transmittance for the high-transmittance state. In the trimming photography mode, the high-transmittance and low-transmittance states are changed alternately. In the high-transmittance and low-transmittance states, similar to that in the ninth embodiment, metered values resulting from the photomerry performed on the whole of the viewfinder are computed to calculate the photometric data of the trimming zone for the trimming mode correctly.

Figure 29:
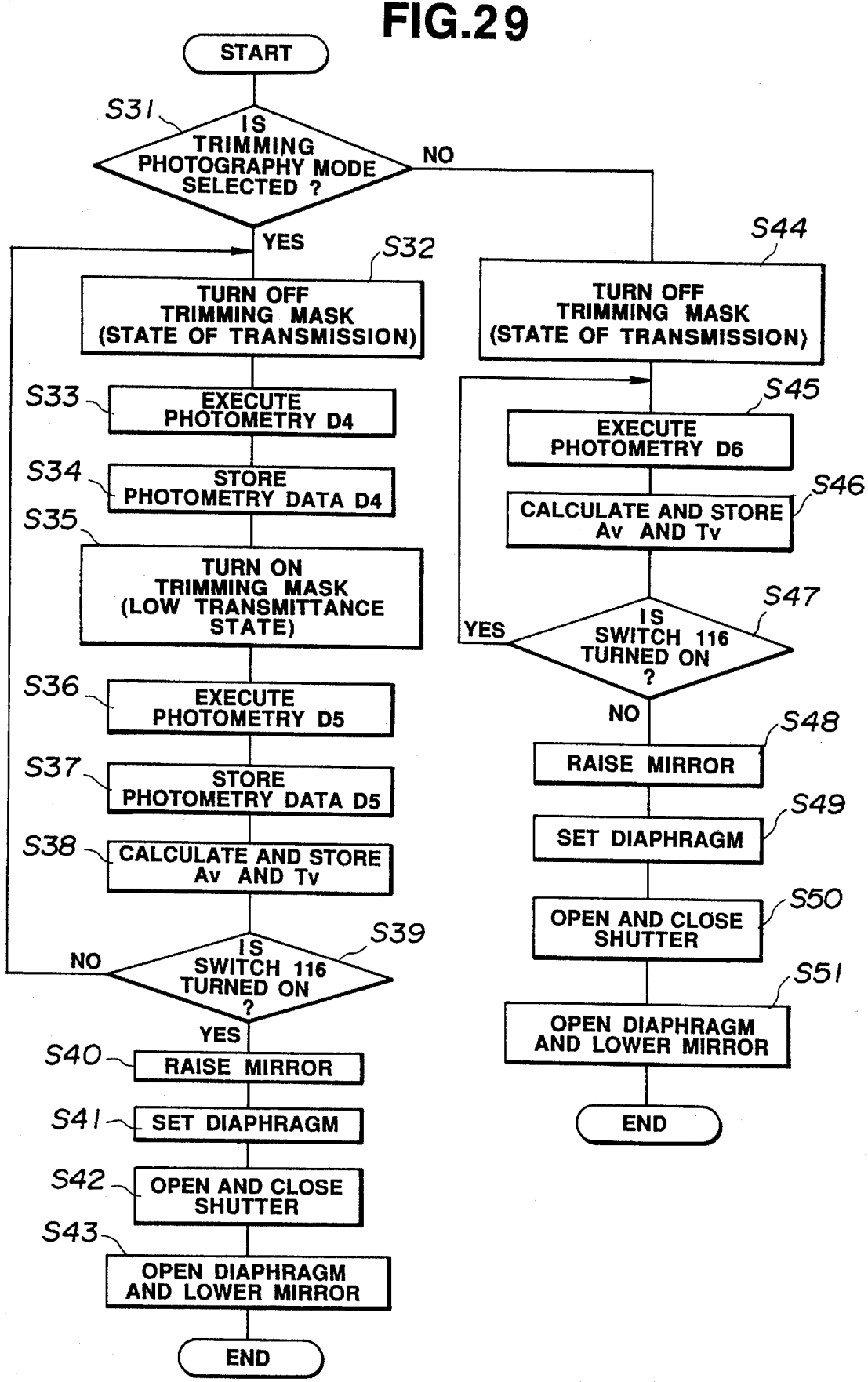
FIG. 29 is a flowchart showing an exposure sequence including photomerry in a camera of an eleventh embodiment.

Next, the operation of a camera having a circuitry using the aforesaid translucency means will be described in conjunction with the block diagram of FIG. 18 showing a circuitry according to the flowchart of FIG. 29. The flowchart shows a subroutine in photomerry.

At a step S31 after the sequence starts, it is determined whether the trimming photography mode is selected. If the trimming photography mode is not selected, control is passed to the step S44. If the trimming photography mode is selected, control is passed to a step S32. For selecting the trimming photography mode, the switch 118 (See FIG. 18) is turned on to activate the trimming select control circuit 117.

When the trimming select mode is selected, at the step S32, the LCD panel 144 is not driven so that the trimming mask zones will remain off. The trimming mask zones of the translucency means are thus placed in the high-transmittance state. In the high-transmittance state, the fourth photomerry (D4) is performed at a step S33. Metered data D4 resulting from the photometry is stored in memory in the CPU 111 at a step S34.

At a step S35, the LCD panel 144 is driven to turn on the trimming mask zones. The trimming mask zones of the translucency means are thus placed in the low-transmittance state. In the low-transmittance state, the fifth photomerry (D5) is executed at a step S36. Metered data D5 resulting from the photomerry is stored in memory in the CPU 111 at a step S37. At a step S38, the metered data D4 resulting from the photomerry performed when the trimming mask zones are in the high-transmittance state and stored in memory of the CPU 111, and the metered data D5 resulting from the photomerry performed when the trimming mask zones are in the low-transmittance state are computed to calculate an f-number and a shutter speed. AV APEX and TV APEX values corresponding to the calculated f-number and shutter speed are then stored in memory in the CPU 111.

If the switch 116 (See FIG. 18) for starting the exposure sequence is not turned on for a certain period of time at a step S39, control is returned to the step S32. The loop of the steps S32 to S39 is repeated until the switch 116 is turned on. When the switch 116 is turned on to enable the exposure sequence, control is passed to a step S40. At steps 40 to 42, exposure operations are carried out. Specifically, the mirror/shutter/diaphragm drive circuit 122 causes the movable reflecting mirror to go up at the step S40. The diaphragm is set at the step S41. The shutter is opened and closed at the step S42. Based on the AV APEX and TV APEX values, the exposure control circuit 121 thus allows the exposure operations for the trimming photography mode to be performed correctly.

When the exposure terminates, at a step S43, the diaphragm is opened and the movable reflecting mirror descends to a specified position. The exposure sequence for the trimming photography mode then terminates.

Back to the step S31, if the trimming photography mode is not selected; that is, the normal photography mode is selected, at a step S44, the LCD panel 144 is not driven so that the trimming mask zones will remain off. The same state as the high-transmittance state is then set up. the state, photomerry (D6) is performed on the whole of the viewfinder at a step S45. At a step S46, metered data D6 resulting from the photometry is computed to calculate an f-number and a shutter speed. AV APEX and TV APEX values corresponding to the calculated f-number and shutter speed are then stored in memory in the CPU 111.

If the switch 116 (See FIG. 18) for starting the exposure sequence is not turned on for a certain period of time at a step S47, control is returned to the step S45. Photomerry and photometric computation are repeated at the steps S45 to S47 until the switch 116 is turned on.

When the switch 116 is turned on to enable the exposure sequence, control is passed to a step S48. Exposure operations are performed at steps S48 to S50. Specifically, the mirror/shutter/diaphragm drive circuit 122 causes the movable reflecting mirror 102 to go up at the step S48. The diaphragm is set at the step S49. The shutter is opened and closed at the step S50. Based on the AV APEX and TV APEX values stored In memory in the CPU 111, the exposure control circuit 121 thus allows the exposure operations for the normal photography mode to be performed correctly.

When the exposure terminates, at a step S51, the diaphragm becomes open and the movable reflecting mirror descends to a specified position. The exposure sequence for the normal photography mode then terminates.

In the aforesaid embodiments, trimming photography is carried out in a panorama size. The present invention can, needless to say, apply to trimming photography in which a picture range is trimmed longitudinally and laterally.

As described above, in the trimming photography mode, photometry Is not oriented to the trimming zone alone but performed on the whole of the viewfinder including the zones outside the trimming zone. A sufficient quantity of light can therefore be used for photomerry. The luminance limit for an object of low luminance does not decrease and the camera performance at the luminance limit remains excellent.

A metered value of an object luminance is computed to provide optimal photometric data for a trimming zone alone. Consequently, an adequate exposure value for trimming photography can be calculated unaffected with the object luminance in the trimming zone.

Next, the twelfth embodiment of the present invention will be described. The twelfth embodiment has substantially the same components as those the first embodiment in FIG. 1 has. Greater emphasis is put on rays, which emerge from the field of view in the viewfinder defined when a minimum picture size is selected, among those entering the light-receiving element in the photomerry unit 9 (See FIG. 1). Less emphasis is put on rays emerging from the surrounding areas of the above range. Whatever picture size 1s selected, the whole film screen is exposed in a well-balanced manner.

Figure 30:
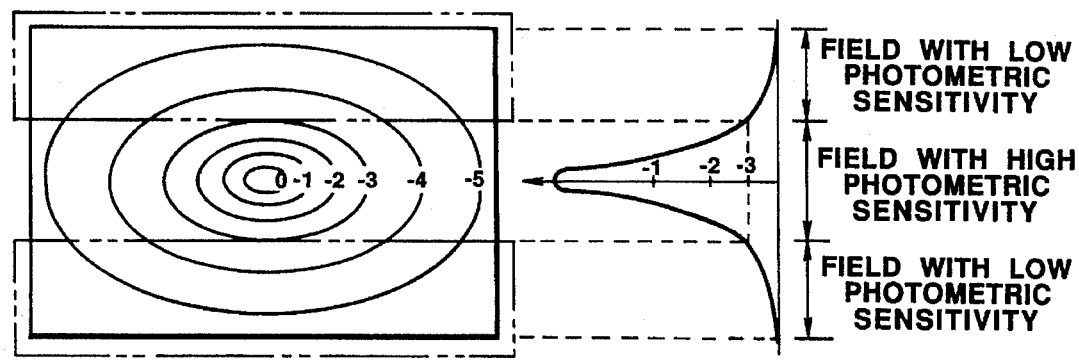
FIG. 30 is a diagram showing an example of photometric sensitivity distribution in a twelfth embodiment of the present invention.

FIG. 30 is a diagram showing the photometric sensitivity distribution in the twelfth embodiment.

Typical objects that are sensed especially bright include the sun, lamps, and reflection from a water surface. These brightness levels are larger by +3 to 5 EV (8 to 32 times as large as) than the other objects. When an attempt is made to determine a total metered value by adding the light originating from the typical objects to the light, which is reflected from objects falling on near the center of a film screen, at a well-balanced ratio, the light reflected from the typical objects must enter a photometric field whose photometric sensitivity is lower by $2^{-3}$ to $2^{-5}$ EV.

In FIG. 30, the masks (See FIG. 1) for defining a picture range are inserted in the areas enclosed with alternate long and two short dashes lines. The portions of the focusing screen 5 (See FIG. 1) corresponding to the masks are shielded, and no light reaches the light-receiving element in the photomerry unit 9. If the photometric sensitivity of the photomerry unit 9 for the portions is higher, or in other words, the results of photometry concerning the portions are weighted greater than those of photomerry concerning the whole of the focusing screen, the results of photometry concerning the portions results in errors. The weight for the portions must be as low as 10% or less, for example, $2^{-3}=⅛=12.5\%$ of the weight for the other portions. The influence of the weight is not traced in a resultant photogram due to the latitude of film.

As mentioned above, the conditions for an ideal photomerry unit include the capacities for taking account of the brightness distribution in surrounding areas in the photography mode of a normal picture size, and minimizing the photometric errors in the surrounding areas in the photography mode of a trimming size.

The twelfth embodiment provides a means for controlling the distribution of photometric sensitivities for the light that emerges from the focusing screen 5 located on the optical path in the viewfinder optical system and that is detected by the light-receiving element. This means controls the distribution so that a field of the distribution with a relatively large photometric sensitivity will fall on the smallest picture range among picture ranges to be changed and fields thereof with relatively small photometric sensitivities will come outside the above field along the circumference of the smallest picture range.

Figure 31:
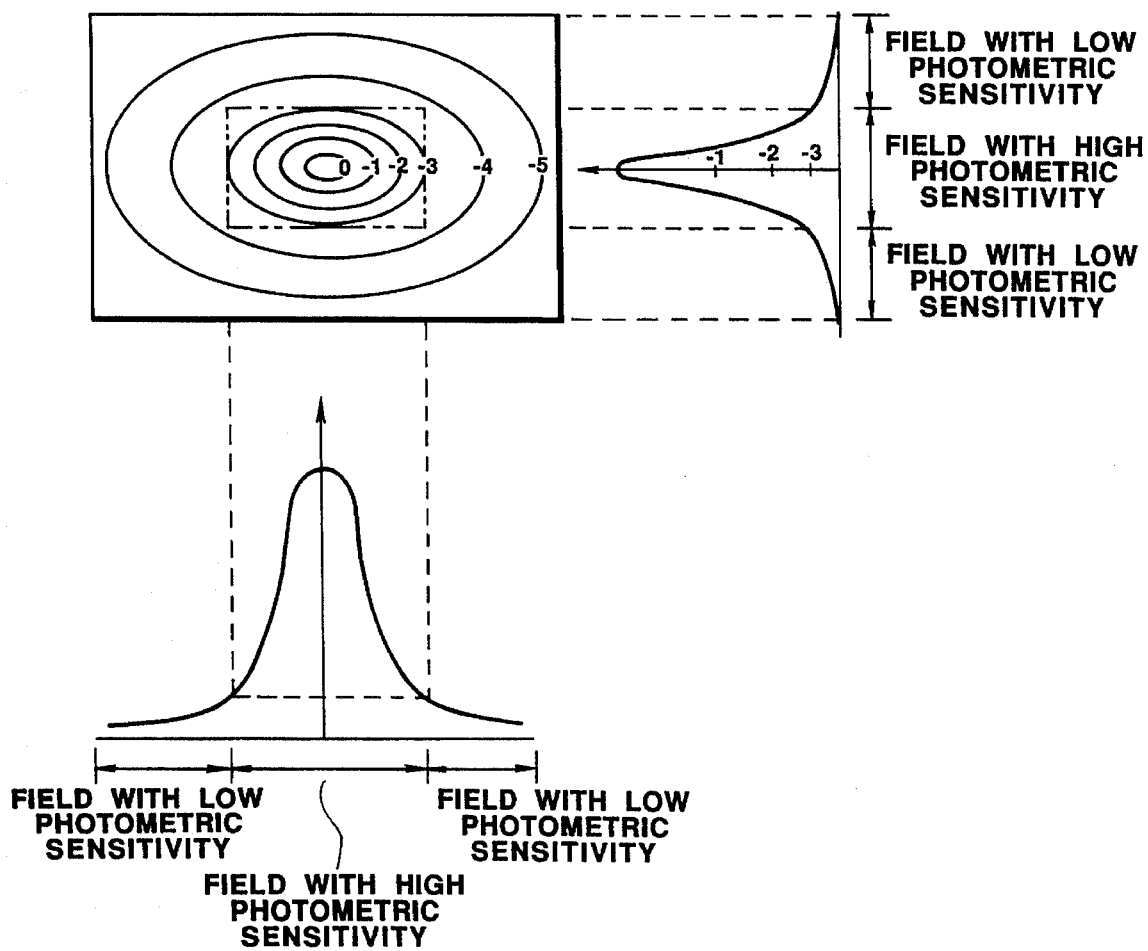
FIG. 31 is a diagram showing another example of photometric sensitivity distribution in the twelfth embodiment of the present invention.
Figure 32:
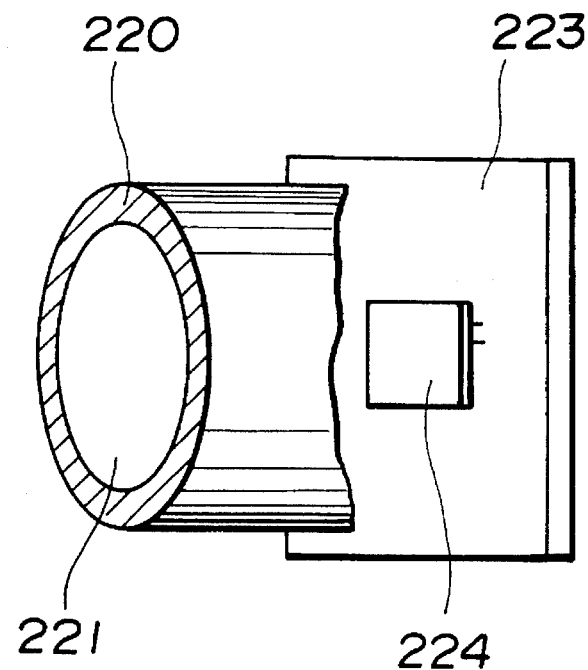
FIG. 32 is an enlarged oblique view of a major portion of a photomerry unit employed in twelfth embodiment.
Figure 33:
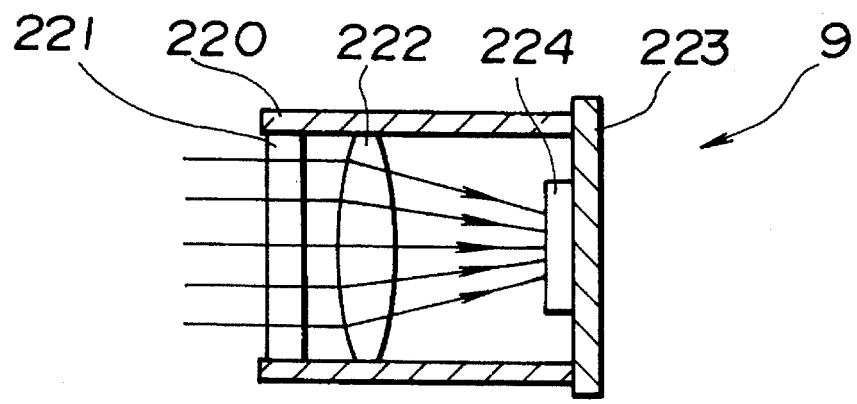
FIG. 33 is an enlarged sectional view of a major portion of the photomerry unit in the twelfth embodiment.

FIG. 30 shows the photometric sensitivity distribution for a trimming picture range of a panorama size. The present invention can be implemented in a picture range which is trimmed longitudinally and laterally as shown in FIG. 31.

Next, a method of controlling rays and providing desired photometric sensitivity distribution will be described with reference to FIGS. 32 to 37.

As illustrated, in the photomerry unit 9, a filter whose transmittance is not uniform over the plane thereof is located in front of a condenser lens 222. The filter 221, condenser lens 222, and a frame 220 are united together and located in front of a light-receiving element 224 resting on a substrate 223. The filter 221 may have a capability of an infrared light cutoff filter, or may consist of liquid crystal display elements for controlling rays. In the latter case, changing photometric sensitivity distribution may be interlocked with changing picture sizes.

Figure 34:
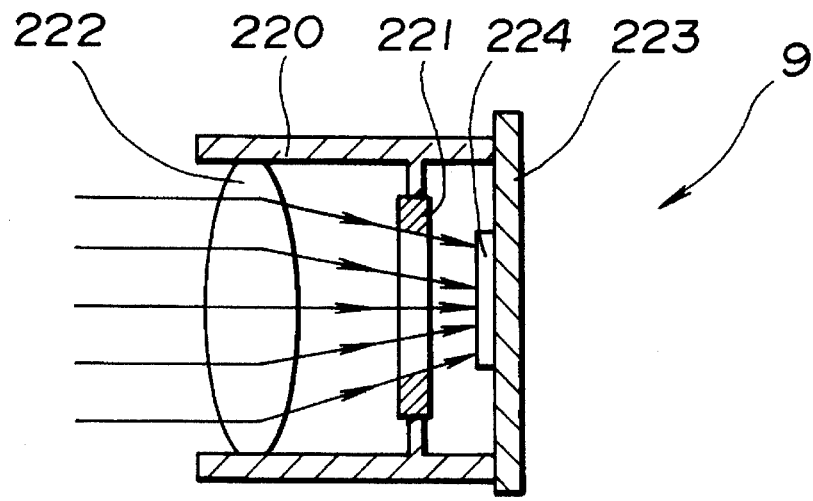
FIG. 34 is an enlarged sectional view of a major portion of a photomerry unit in a thirteenth embodiment.

Next, the thirteenth embodiment of the present invention will be described. The thirteenth embodiment has the same components as those the twelfth embodiment has except the photomerry unit 9. FIG. 34 is an enlarged sectional view of a major portion of the photometry unit 9 in the thirteenth embodiment.

In the photomerry unit 9 in the thirteenth embodiment, unlike the one in the twelfth embodiment, the locations of the filter 221 and condenser lens 222 are reversed back and forth. The operation and advantages are identical to those in the twelfth embodiment.

Next, the fourteenth to sixteenth embodiments will be described. The fourteenth to sixteenth embodiments are variants of the photomerry unit 9, wherein the shape of the condenser lens 222 is modified.

Figure 35:
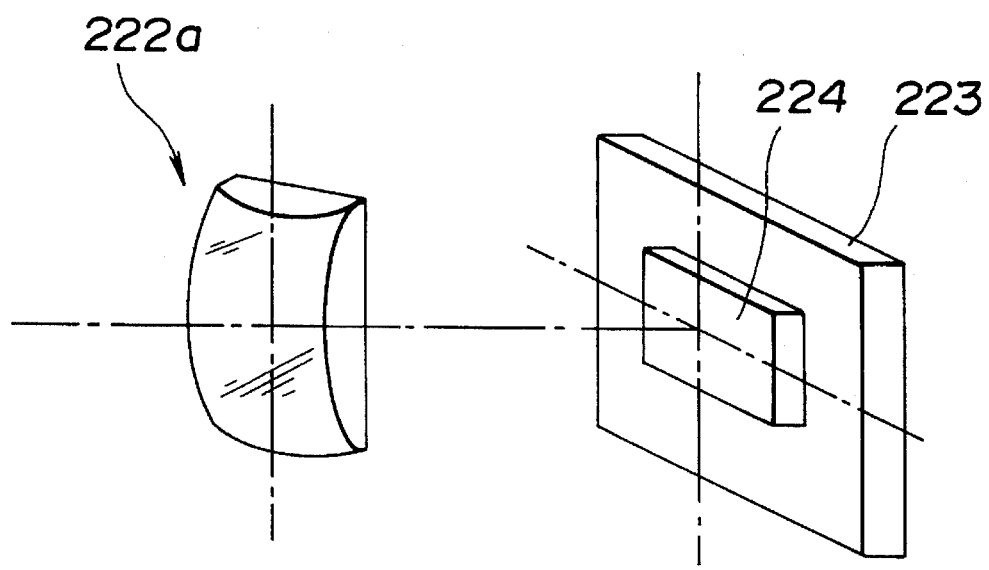
FIG. 35 is an oblique view showing a condenser lens in a photomerry unit in the fourteenth embodiment of the present invention.

In the fourteenth embodiment, as shown in FIG. 35, a spherical lens whose upper and lower portions are cut out is used as a condenser lens 222*a* so that the photometric sensitivity distribution can be determined easily depending on the shape of a film screen or a trimming picture range.

Figure 36:
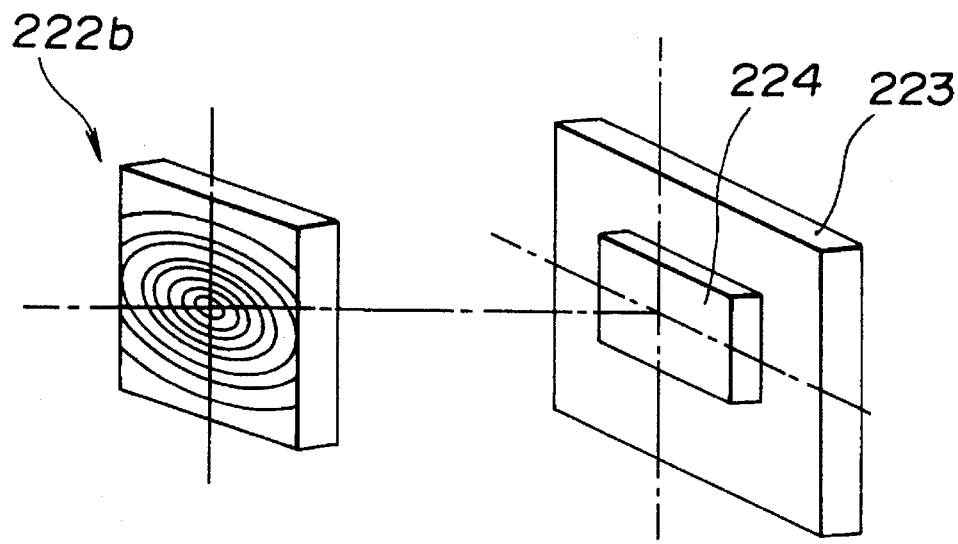
FIG. 36 is an oblique view showing a condenser lens in a photomerry unit in a fifteenth embodiment of the present invention.

In the fifteenth embodiment, as shown in FIG. 36, a Fresnel lens is used as a condenser lens 222*b* for easier control of photometric sensitivity distribution.

Figure 37:
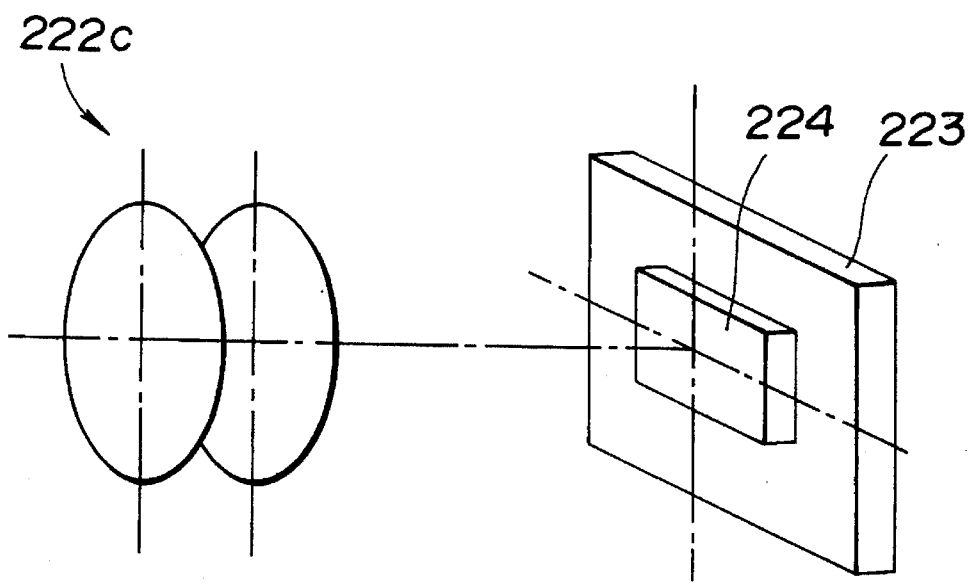
FIG. 37 is an oblique view showing a condenser lens in a photomerry unit in a sixteenth embodiment of the present invention.

In the sixteenth embodiment, as shown in FIG. 37. multiple lenses 222c are used to control rays and eventually control photometric sensitivity distribution. On behalf of the multiple lenses, one aspherical lens may be used for simplification.

Figure 38:
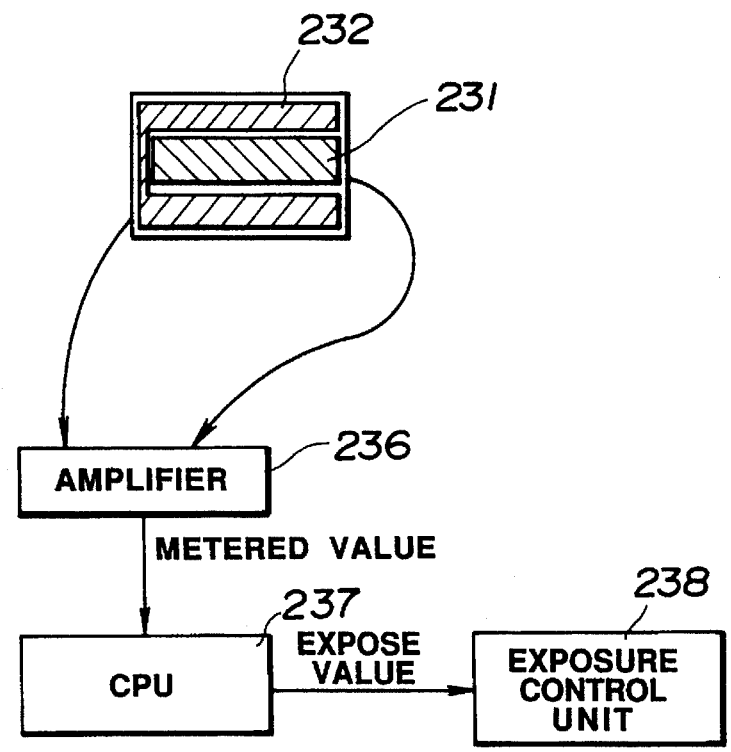
FIG. 38 is a block diagram showing major components of a picture size selective camera of a seventeenth embodiment of the present invention.

Next, the seventeenth embodiment of the present invention will be described. FIG. 38 is a block diagram showing major components of a picture size selective camera of the seventeenth embodiment.

The seventeenth embodiment controls photometric sensitivity distribution using an electric method. The fundamental components are identical to those in the twelfth embodiment. Different components alone will be described.

Figure 39:
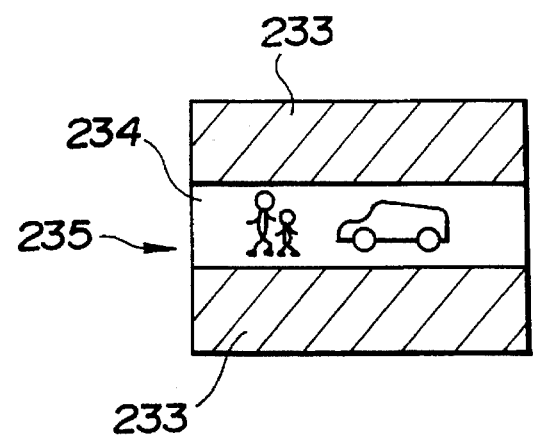
FIG. 39 is a front view showing the field of view in a viewfinder in the seventeenth embodiment.

FIG. 39 is a front view showing the field of view in a viewfinder in the seventeenth embodiment.

As illustrated, a film screen 235 has areas 233 unused for printing in the trimming photography mode and an area 234 used for printing. The light-receiving element receives light emitted from an image formed on the focusing screen 5 (See FIG. 1) located on the optical path in the viewfinder optical system. The light-receiving element is divided into portions in one-to-one correspondence with the area 234 to be printed and the areas 233 not to be printed. In FIG. 38, reference numerals 231 and 232 denote light-receiving sections for receiving light.

The light detected by the light-receiving sections 231 and 232 is amplified by an amplifier 236 and processed by a CPU 237. An exposure value is then determined. The exposure value is sent to an exposure control unit 238. Exposure is then controlled. The CPU 237 weights the value to detected by the light-receiving section 231. Even in the normal photography mode, the value detected by the light-receiving element 231 is weighted but the values detected by the light-receiving elements 232 are not.

In any method, an optical element can be molded easily using acrylic or other plastic material. An optical system for photomerry can be constructed with ease and at low cost.

Figure 40:
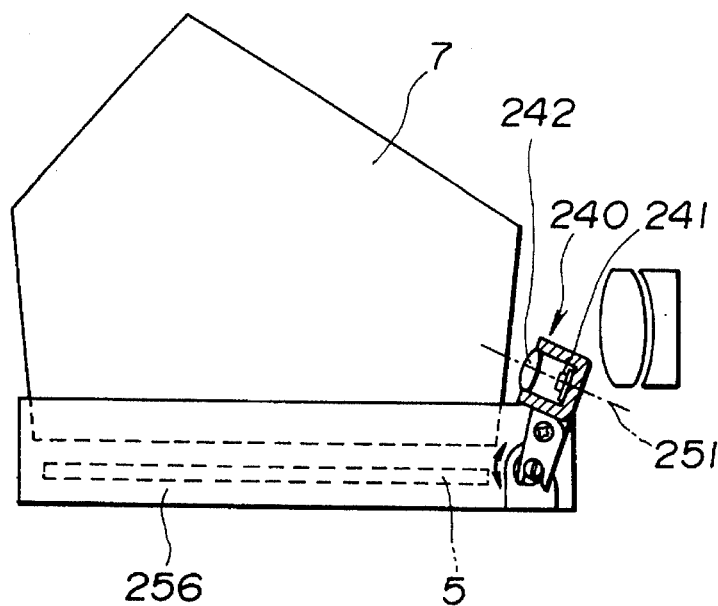
FIG. 40 is a side sectional view showing major components of a picture size selective camera of an eighteenth embodiment of the present invention.
Figure 41:
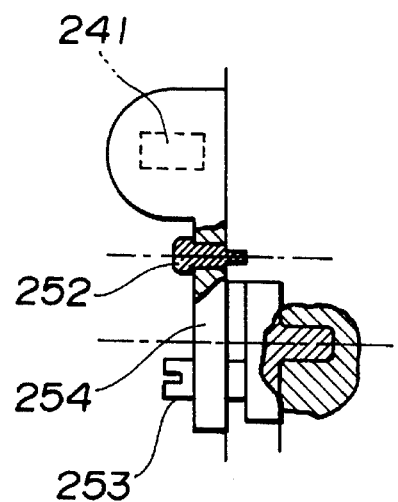
FIG. 41 is an enlarged side sectional view of a photomerry unit in the eighteenth embodiment.
Figure 42:
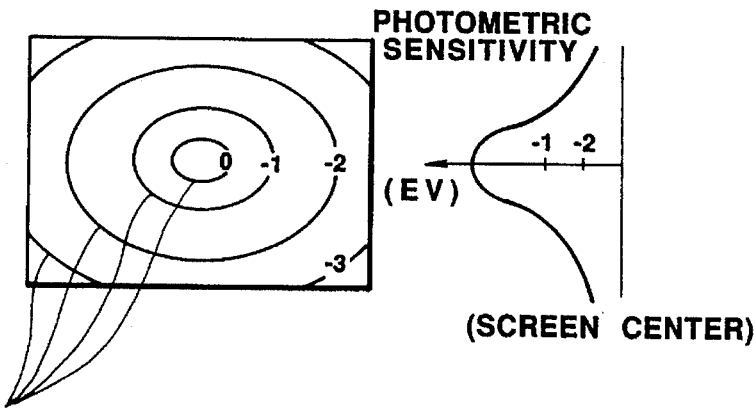
FIG. 42 is an explanatory diagram showing the distribution of sensitivity of a photomerry unit in a conventional picture size selective camera with respect to incident rays emerging through a focusing screen.
Figure 43:
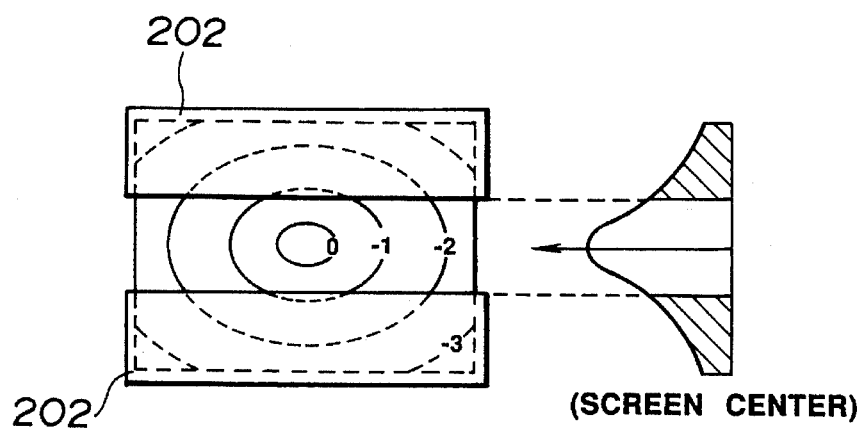
FIG. 43 is an explanatory diagram showing the distribution of sensitivity of a photomerry unit in a conventional picture size selective camera occurring when viewfinder field masks are used to restrict a focusing screen to a panorama size.
Figure 44:
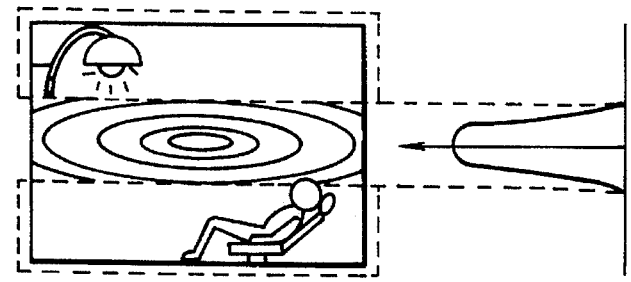
FIG. 44 is an explanatory diagram showing an example of photometric sensitivity distribution in a conventional picture size selective camera.

Next, the eighteenth embodiment of the present invention will be described. FIG. 40 is a side sectional view of major components of a picture size selective camera of the eighteenth embodiment. FIG. 41 is an enlarged side sectional view of a major portion of a photometry unit in the eighteenth embodiment.

In the eighteenth embodiment, a direction adjustment mechanism is installed in the photometry unit 9 in the twelfth embodiment so that photometric sensitivity distribution can be controlled more reliably. The other components are identical to those in the twelfth embodiment. Different components alone will be described below.

A photometry unit 240 includes a condenser lens 242 and a light-receiving element 241. The orientation of the optical axis 251 determines the photometric sensitivity distribution on the focusing screen 5 (See FIG. 1). A case 254 in which the photomerry unit 240 is encased is mounted on a rotation axis 252 attached to a supporting frame 256 which supports the pentagonal roof prism 7 (See FIG. 1) and focusing screen 5, so that the case 254 can rotate around the rotation axis 252. One end of the case 254 is immobilized by an eccentric pin 253 attached to the supporting frame 256. The photometric sensitivity distribution can be adjusted easily by turning the eccentric pin 253.

According to the eighteenth embodiment, decentering adjustment enables distribution adjustment along the short side of the focusing screen 5. In the panoramic photography or pseudo-telephotography mode, an error occurring when the interval between adjoining contour lines in a photometric sensitivity distribution map Is narrower vertically; that is, the orientation of the photomerry unit is deviated vertically is larger than an error occurring when the interval is narrower laterally; that is, the orientation is deviated laterally. The photometric sensitivity distribution becomes therefore hard to adjust. However, when the mechanism in the eighteenth embodiment is adopted, the adjustment can be achieved effortlessly.

As described above, the twelfth to eighteenth embodiments provide a picture size selective camera including a photomerry unit that whatever picture size is adopted for photography, enables exposure with well-balanced quantities of light.

Next, the nineteenth embodiment of the present invention will be described. The nineteenth embodiment has substantially the same components as the ninth embodiment has (See FIG. 14).

Figure 45A:
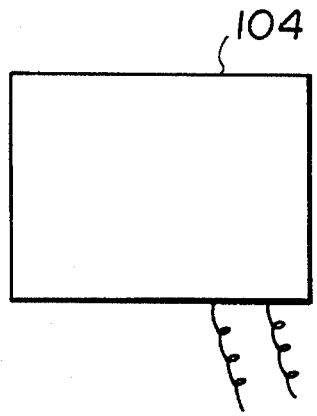
FIGS. 45A and 45B are front views showing the field of view in a viewfinder in a camera of a nineteenth embodiment of the present invention which is set to the states for normal photography and trimming photography.
Figure 45B:
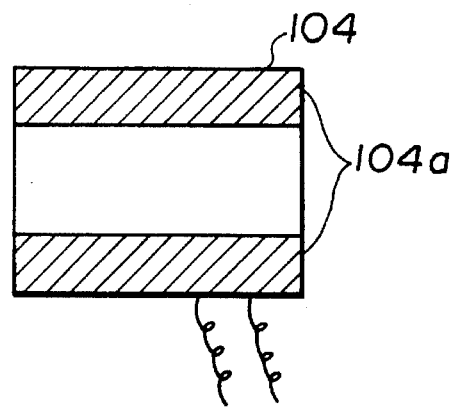

The LCD panel 104 (See FIG. 14) in the nineteenth embodiment can assume two states for the normal photography mode and trimming photography mode as shown in FIGS. 45A and 45B. Specifically, in the normal photography mode, as shown in FIG. 45A, the whole of the LCD panel 104 enters the transparent state. When the trimming photography mode is selected, as shown in FIG. 45B, the upper and lower band-like zones 104aa of the LCD panel 104 become opaque and enters the shading state in which light is not transmitted. In this embodiment, trimming photography is panoramic photography in which the lateral dimension of a picture size is the same as that for normal photography but the longitudinal dimension thereof is smaller.

In the trimming photography mode, the field of view in the viewfinder is restricted by the LCD panel 104 located above the focusing screen 103. In the normal photography mode, as shown in FIG. 45A, the whole of the LCD panel 104 corresponding to the whole of the focusing screen 103 enters the transparent state. Observation of an object image and photomerry of an object are performed on the whole of the focusing screen 103.

In contrast, photomerry in the trimming photography mode will be described. As shown in FIG. 45B, the LCD panel 104 is driven to shade zones 104aa except a trimming zone. The field of view in the viewfinder corresponding to the trimming zone is thus made available. An optical object image on the focusing screen 103 is transmitted by the trimming zone of the LCD panel 104 but is not transmitted by the shading zones which have become opaque diffusing surfaces. The portion of the object image on the focusing screen 103 falling on the trimming zone reaches the eyepiece lens 106 and then is observed. When photomerry is performed in this state, only the beam emitted from the portion of the object image falling on the trimming zone is converged on the photomerry light-receiving element 108 by the photomerry lens 107. The luminance metered by the light-receiving element 108 becomes lower than that in the normal photomerry mode.

In the nineteenth embodiment, in the trimming photography mode, photometry is performed on the whole of the LCD panel 104 corresponding to the whole field of view in the viewfinder in the same manner as that in the normal photography mode.

In the normal photography mode, similar to that in the ninth embodiment, as shown in FIG. 16, the whole of the focusing screen 103 corresponds to the field of view 109 in the viewfinder. A photographer observes the field of view in the viewfinder.

Figure 46A:
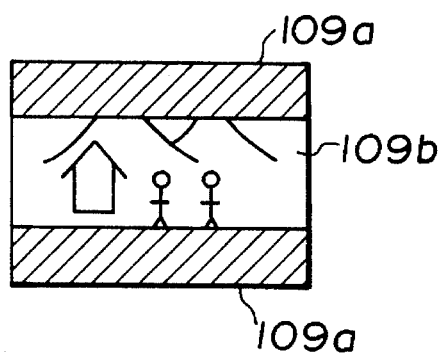
FIGS. 46A and 46B are front views showing the field of view in a viewfinder in the camera of the nineteenth embodiment showing the states in which photography is performed and not performed in the trimming (panorama) photography mode.
Figure 46B:
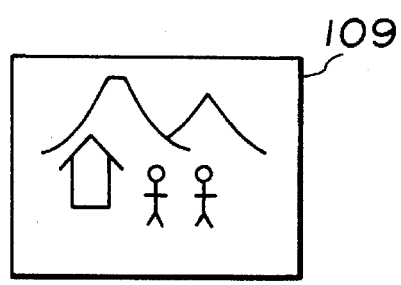

In the trimming photography mode, when photomerry is not performed, as shown in FIG. 46A, the LCD panel 104 is driven to shade shading zones 109a. The trimming zone becomes consistent with the field of view 109b in the viewfinder. When photomerry is performed in the trimming mode, the LCD panel is re-driven and the shading zones 109a shown in FIG. 46A become, as shown in FIG. 46B, unshielded. Similar to that in the normal photography mode shown in FIG. 16, the whole of the focusing screen 103 becomes consistent with the field of view 109 in the viewfinder. A beam of an object image appearing in the whole of the focusing screen 103, similar to that in the normal photography mode, is converged on the photomerry light-receiving element 108 by the photomerry lens 107. The object luminance is then metered. The photometric optical system is thus controlled similar to that in the normal photography mode, which provides a correct metered value.

The circuitry in the nineteenth embodiment is identical to that in the ninth embodiment and as shown in FIG. 18.

To be more specific, the CPU 111 for controlling the operation of the camera outputs a signal for controlling film wind or rewind to the film feed control circuit 112, a signal for controlling auto-focusing to the auto-focusing control circuit 113, and a signal for driving the zoom/focus lens in a lens array (See FIG. 1) to the lens drive control circuit 114. The switch 115 for starting auto-focusing and switch 116 for starting the exposure sequence after auto-focusing is completed are connected to the CPU 111. The other terminals of the switches 115 and 116 are grounded.

The switch 118 for selecting either the normal photography mode or trimming photography mode is connected to the trimming select control circuit 117. The other terminal of the switch 118 is grounded. A mode select signal supplied with the make of the switch 118 is sent from the trimming select control circuit 117 to the CPU 111. A trimming select control signal sent from the trimming select control circuit 117 is supplied to the exposure mask control circuit 119. An exposure mask select control signal sent from the exposure mask select control circuit 119 is supplied to the film exposure mask members and their driving system, which are not shown, thus changing the exposure range of film.

The trimming select control signal sent from the trimming select control circuit 117 is output to the LCD panel driver 120. The LCD panel diver 120 causes the LCD panel 104 to change the field of view in the viewfinder.

The CPU 111 supplies a signal for controlling exposure to the exposure control circuit 121. The trimming select control circuit 117 supplies the trimming select control signal to the exposure control circuit 121. The exposure control circuit 121 outputs a signal for driving the mirror, shutter, and diaphragm to the mirror/shutter/diaphragm drive circuit 122. The drive circuit 122 drives the mirror, shutter, and diaphragm which are not shown. The exposure control circuit 121 outputs an exposure control signal for controlling photometry to the photomerry control circuit 123. The photomerry control circuit 123 supplies an object luminance value metered by the photomerry light-receiving element 108 to the CPU 111 via the exposure control circuit 121.

Figure 47:
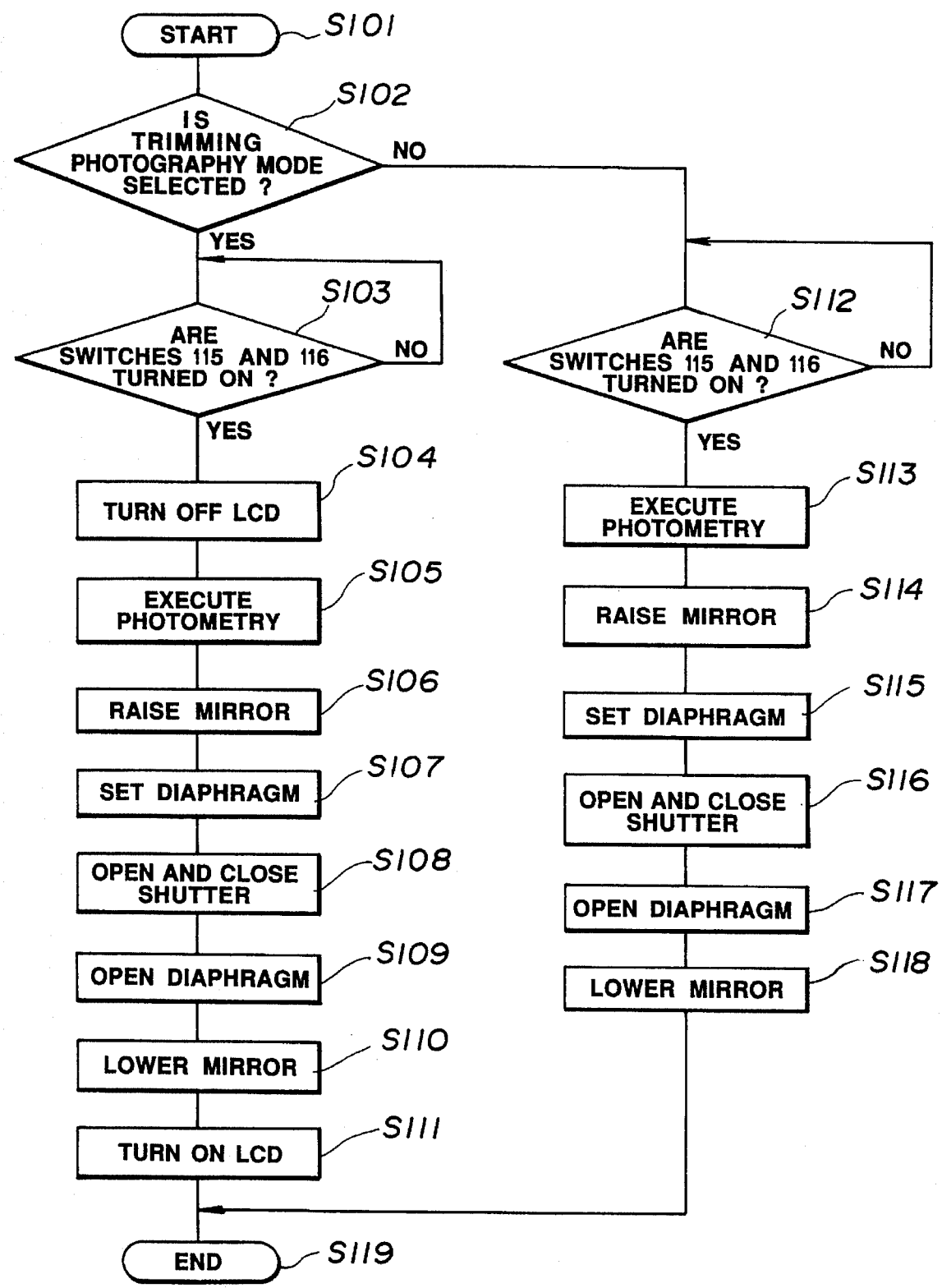
FIG. 47 is a flowchart showing an exposure sequence including photomerry in the camera of the nineteenth embodiment.

Next, the operation of the nineteenth embodiment having the aforesaid circuitry will be described in conjunction with the flowchart of FIG. 47. The flowchart shows a subroutine in photomerry. At a step S101, the sequence starts. Control then passes to a step S102. At the step S102, it is determined whether the trimming photography mode is selected. If the trimming photography mode is not selected, control is passed to a step S112. If the trimming photography mode is selected, control is passed to a step S103. For selecting the trimming photography mode, the switch 118 is turned on to activate the trimming select control circuit 117.

When the trimming photography mode is selected, the exposure mask select control circuit 119 changes film exposure masks, which are not shown, into trimming masks. When the LCD panel 104 is driven, a trimming field of view is set in the viewfinder.

At the step S103, the states of the switches 115 and 116 are detected. The operation of the step S103 is repeated until the switches 115 and 116 are turned on. When the switches 115 and 116 are turned on; that is, when auto-focusing terminates and the exposure sequence is enabled, control is passed to a step S104. At the step S104, the LCD panel 104 is released from drive. The whole of the LCD panel 104 enters the transparent state. Similar to that in the normal photography mode, the whole of the viewfinder serves as the field of view. Control is then passed to a step S105. At the step S105, the whole of the LCD panel 104 is placed in the transparent state and the luminance of an object is metered by the photomerry light-receiving element 108. Photomerry is completed for a short period of time. Control is then passed to a step S106.

When the photomerry of an object terminates, the mirror/shutter/diaphragm drive circuit 122 causes the movable reflecting mirror 102 to go up (step S106). The diaphragm is set (step 9107). The shutter is opened and closed (step S108). These operations are performed on the basis of the results of computation provided by the exposure control circuit 121. An exposure value is thus calculated correctly.

When the exposure terminates, control is passed to a step S109. At the step S109, the diaphragm becomes open. Control is then passed to a step S110. At the step S110, the movable reflecting mirror goes down. Control is then passed to a step S111. At the step S111, the LCD panel 104 is driven and the trimming field of view is set in the viewfinder. Photographer observes the portion of an object image falling on the trimming field of view in the viewfinder. Control is then passed to a step S119. The exposure sequence including the photomerry for the trimming photography mode thus terminates.

Back to the step S102, if the trimming photography mode is not selected; that is, the normal photography mode is selected, control is passed to the step S112. At the step S112, the operation of the step S112 is repeated until the switches 115 and 116 are turned on. When the switches 115 and 116 are turned on, control is passed to a step S113. At the step S113, the whole of the LCD panel 104 is placed in the transparent state and the object luminance is metered by the photomerry light-receiving element 108. An exposure value is then calculated correctly.

When the photometry of an object terminates, similar to the steps S106 to S108, the mirror up, diaphragm setting, and shutter open/close operations are carried out at steps S114 to S116. Exposure is then completed. Control is then passed to a step S117. The diaphragm becomes open. Control is then passed to a step S118. At the step S118, the movable reflecting mirror goes down. A photographer observes an object image of the normal photography mode in the viewfinder. Control is then passed to a step S119. The exposure sequence including the photomerry for the normal photography mode thus terminates.

In the nineteenth embodiment, an LCD is used to change the field of view in a viewfinder. The LCD need not be employed. Alternatively, shading masks may be designed to come in or out of the optical path in the viewfinder optical system. The shading masks may, needless to say, be realized with translucent mask plates.

As for the photometric range, whichever of center-oriented photometry or average photometer is adopted, it is not restricted to a specific range as long as a wide range exceeding a trimming picture range is subjected to photometry.

Panoramic photography is given as an example of the trimming photography mode. Trimming may be achieved by arbitrarily restricting the angle of view vertically and laterally.

According to the nineteenth embodiment, in the trimming photography mode, a picture range for the trimming photograph mode is selected to observe an object image. During photomerry, a picture range for the normal photography mode is selected so that photomerry will be performed on the whole field of view in the viewfinder. This enables correct photomerry. The quantity of light to be metered is therefore larger than that when photomerry is performed on the trimming field of view in the viewfinder. The photometric limit at low luminance can therefore be raised.

In the present invention, it will be apparent that a wide range of different working modes can be formed on the basis of the invention without departing from the spirit and scope of the invention. This invention is not restricted to any specific embodiment but limited to the appended claims.

What is claimed is:

1. A camera enabling selection of one of a normal photography mode in which an object image formed by a lens array is printed as it is or in proportional size, and a trimming photography mode in which part of the image is enlarged and printed, including:

mask means for use in confirming an object range for the trimming photography mode in a viewfinder; said mask means being formed with translucent members;

means for positioning said mask means in a field of view in the viewfinder for trimming photography; and said mask means being formed with porous opaque members.

2. A camera enabling selection of one of a normal photography mode for photographing a normal picture range and a trimming photography mode for photographing a trimming picture range that is narrower than said normal picture range, comprising:

a viewfinder optical system that routes a beam emerging from an entire normal picture; and a light reducing means located in a vicinity of said viewfinder optical system for reducing light from a beam emerging from a portion of the normal picture range associated with said light reducing means, responsive to selection of said trimming photography mode, while light from the beam emerging from said trimming picture range is not reduced;

said light reducing means including masks for transmitting only light of a specified wavelength.

3. A camera enabling selection of one of a normal photography mode for photographing a normal picture range and a trimming photography mode for photographing a picture range that is narrower than said normal picture range, comprising:

a viewfinder optical system for routing a beam emerging from an entire normal picture range;

a display means located in a vicinity of said viewfinder optical system for deflecting part of said beam emerging from said entire normal picture range and displaying said trimming picture range and/or photography mode in the viewfinder responsive to selection of said trimming photography mode; and including transparent masks and having a structure such that portions of said display means representing boundaries of said trimming picture range and/or said photography mode deflect a beam owing to inclined planes engraved on surfaces of said transparent masks.

4. A camera enabling selection of one of a normal photography mode for photographing a normal picture range and a trimming photography means for photographing a picture range that is narrower than said normal picture range, comprising:

a viewfinder optical system that routes a beam emerging from an entire normal picture range; and a masking means that, when said trimming photography mode is selected from said photography modes, is arranged as part of said viewfinder optic system; said masking means displaying said trimming picture range and controlling said beam so that a portion of an object image falling in ranges other than said trimming picture range can also be observed;

said masking means including zones for transmitting only light of a specified wavelength.

5. A picture size selective camera, comprising:

a photography mode selecting means for selecting one of a photography mode of a normal size and a photography mode of a size different from a said normal size; and a viewfinder that shows a film screen used for printing in a field of view according to an output of said photography mode selecting means;

said viewfinder including a light value control means that distinguishes between a range corresponding to said film screen and other ranges in said field of view is transparent and translucent zones;

said light value control means including mask plates for transmitting only light of a specified wavelength and a mask plate actuating means.

6. A picture size selective camera, including:

a photography mode selecting means that selects one of a normal photography mode for photographing a normal picture range and a trimming photography mode for specifying a trimming picture range that is narrower than the normal picture range; and plural display means each of which is formed with a transparent member and includes an indicator for indicating a boundary of a picture range;

said display means coming in or out of an optical path in a viewfinder according to movement of said photography mode selecting means;

each of said boundary indicators consisting of inclined planes engraved on a surface of each of the transparent members.

7. A picture size selective camera, including:

a photography mode selecting means for use in selecting one of a normal photography mode for photographing a normal picture range and a trimming photography mode for specifying a trimming picture range that is narrower than the normal picture range; and plural display means each of which is formed with a transparent member and includes an indicator for defining picture range and indicating a photography mode;

said display means coming in or out of an optical path in a viewfinder according to movement of said photography mode selecting means;

each of said indicators for indicating a photography mode consisting of inclined planes engraved on a surface of each of said transparent members and indicates a photography mode using total reflection of light.

8. A photometry unit in a camera enabling selection Of one of a normal photogtography mode and a trimming photography mode in which a picture range that is narrower than a picture range for the normal photography mode is specified as a trimming picture range, comprising;

means located on an optical path in a viewfinder for changing a field of view in the viewfinder between normal photography and trimming photography; and a photometry means located on the optical path in the viewfinder; said photometry means having a photometric range corresponding to substantially an entire focusing screen in the viewfinder, and having a photometric sensitivity distribution that applies a larger weight to the trimming picture range and smaller weight to other ranges; and a weight to be applied to ranges other than the trimming picture range according to a sensitivity distribution that is smaller by $2^{-3}$ EV than a weight to be applied to the trimming picture range.

9. A camera enabling selection of one of a normal photography mode for photographing a normal picture range and a trimming photography mode for photographing a picture range that is narrower than said normal picture range, comprising:

a selecting means for selecting one of said photography modes;

a masking means that responds to selection of said selecting means and that when said trimming photography mode is selected, masks a beam reflected from an object except for a portion of a beam emerging from said trimming picture range; and a photometry means for metering a beam reflected from said object;

said photometry means being capable of metering a beam emerging from a range that is larger than a minimum trimming picture range in said trimming photography mode; and showing higher photosensitivity for said minimum trimming picture range than that for ranges other than the minimum trimming picture range.

10. A camera according to claim 9, wherein said photometry means has a photometric sensitivity, which is higher by $2^{-3}$ EV than a peak value of photometric sensitivity distribution, for said minimum trimming picture range.

11. A camera according to claim 9 wherein said photometry means is adjustable to alter a photometric sensitivity distribution of said photometry means to an image field of an object.

12. A camera enabling selection of a normal photography mode for photographing one of a normal picture range and a trimming photography mode for photographing a picture range that is narrower than said normal picture range, comprising:

a light-receiving means for receiving a beam from an entire normal picture range;

a selecting means for selecting one of said photography modes;

a light reducing means responsive to a selection of said selecting means and that when said trimming photography is selected, eliminates a beam emerging from said entire normal picture range and entering said light-receiving means except for that portion of the beam emerging from said trimming picture range;

a photometry means for metering an output of said light-receiving means regardless of a selection state of said selecting means; and control means for controlling said light reducing means so that said light reducing means will be placed in one of a light reducing state and a non-light reducing state; and when said photomerry means performs photometry, said control means places said light reducing means in the non-light reducing state.

\* \* \* \* \*